US012126991B1

(12) United States Patent
Brown et al.

(10) Patent No.: US 12,126,991 B1
(45) Date of Patent: *Oct. 22, 2024

(54) METHOD AND APPARATUS FOR PROTECTING SENSITIVE DATA

(71) Applicant: IntraNext Software, Inc., Englewood, CO (US)

(72) Inventors: Patrick Brown, Parker, CO (US); James Mitch, Lone Tree, CO (US); Michael Verlare, Centennial, CO (US)

(73) Assignee: INTRANEXT SOFTWARE, INC., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,186

(22) Filed: Sep. 12, 2022

Related U.S. Application Data

(63) Continuation of application No. 16/449,316, filed on Jun. 21, 2019, now Pat. No. 11,445,363.

(60) Provisional application No. 62/717,772, filed on Aug. 10, 2018, provisional application No. 62/699,730, filed on Jul. 17, 2018, provisional application No. 62/688,380, filed on Jun. 21, 2018.

(51) Int. Cl.
*G06F 17/00* (2019.01)
*H04L 29/06* (2006.01)
*H04W 12/02* (2009.01)
*H04W 12/03* (2021.01)

(52) U.S. Cl.
CPC ........... *H04W 12/02* (2013.01); *H04W 12/03* (2021.01)

(58) Field of Classification Search
CPC .............................. H04W 12/02; H04W 12/03

USPC ............................................................ 726/1
See application file for complete search history.

(56) References Cited

U.S. PATENT DOCUMENTS

| 5,790,798 | A | 8/1998 | Beckett |
| 5,870,464 | A | 2/1999 | Brewster |
| 6,871,213 | B1 | 3/2005 | Graham |
| 7,130,800 | B1 | 10/2006 | Currey et al. |
| 8,275,115 | B1 | 9/2012 | Everingham et al. |
| 8,315,867 | B1 | 11/2012 | Blair |

(Continued)

FOREIGN PATENT DOCUMENTS

GB    2473376 A    12/2009

OTHER PUBLICATIONS

Faruquie et al., Protecting Sensitive Customer Information in Call Center Recordings, Oct. 2009, IEEE international Conference on Services Computing, pp. 81-88 (Year 2009).

(Continued)

*Primary Examiner* — Jeffrey C Pwu
*Assistant Examiner* — Samuel Ambaye
(74) *Attorney, Agent, or Firm* — Vobach IP Law, LLC

(57) ABSTRACT

In accordance with one embodiment, a method of modifying data in a telecommunication system can be implemented by receiving a communication comprising voice data and non-voice data at a first processor; sending the non-voice data from the first processor to a second processor; sending the voice data from the first processor to a third processor; receiving a sensitive-data-alert-message at the second processor from a fourth processor; and, in response to the sensitive-data-alert-message from the fourth processor, producing a set of modified-non-voice data at the second processor by removing a set of sensitive data contained within the non-voice data.

14 Claims, 26 Drawing Sheets

(56) References Cited

U.S. PATENT DOCUMENTS

| | | | |
|---|---|---|---|
| 8,582,764 | B2 | 11/2013 | Van Volkenburgh |
| 8,618,951 | B2 | 12/2013 | Johansen et al. |
| 8,639,920 | B2 | 1/2014 | Stack |
| 8,706,486 | B1 | 4/2014 | Devarajan et al. |
| 8,750,417 | B2 | 6/2014 | Zhu et al. |
| 8,750,471 | B2 | 6/2014 | Tew et al. |
| 8,831,204 | B1 | 9/2014 | Pycko et al. |
| 8,958,557 | B2 | 2/2015 | Watson et al. |
| 9,100,484 | B1 | 8/2015 | Kleck |
| 9,160,853 | B1 | 10/2015 | Daddi |
| 9,178,974 | B2 | 11/2015 | Ross et al. |
| 9,307,084 | B1 | 4/2016 | Pycko |
| 9,699,317 | B1 | 7/2017 | Pycko |
| 9,858,573 | B2 | 1/2018 | Tew et al. |
| 9,881,178 | B1 * | 1/2018 | Brown ............... H04M 3/5183 |
| 10,402,826 | B2 | 9/2019 | Tew et al. |
| 10,956,605 | B1 | 3/2021 | Brown et al. |
| 11,049,108 | B2 | 6/2021 | Tew et al. |
| 11,445,363 | B1 | 9/2022 | Brown et al. |
| 2003/0069804 | A1 | 4/2003 | Barry |
| 2004/0213390 | A1 | 10/2004 | Lazarus |
| 2005/0246242 | A1 | 11/2005 | Proctor |
| 2006/0190263 | A1 | 8/2006 | Finke |
| 2007/0106892 | A1 | 5/2007 | Engberg |
| 2007/0174390 | A1 | 7/2007 | Silvain |
| 2007/0242658 | A1 | 10/2007 | Rae |
| 2008/0224906 | A1 | 9/2008 | Plamondon |
| 2008/0291901 | A1 | 11/2008 | Stratton |
| 2009/0046841 | A1 | 2/2009 | Hodge |
| 2009/0199015 | A1 | 8/2009 | Krishnapuram |
| 2009/0310774 | A1 | 12/2009 | Hendricks |
| 2010/0167692 | A1 | 7/2010 | Haynes |
| 2010/0202611 | A1 | 8/2010 | Watson |
| 2010/0241844 | A1 | 9/2010 | Hussain |
| 2010/0257612 | A1 | 10/2010 | McGuire |
| 2011/0228919 | A1 | 9/2011 | Tew |
| 2011/0317828 | A1 | 12/2011 | Corfield |
| 2012/0027195 | A1 | 2/2012 | Shaffer |
| 2013/0024368 | A1 | 1/2013 | Scammell |
| 2013/0067245 | A1 | 3/2013 | Horovitz |
| 2013/0266127 | A1 | 10/2013 | Schachter |
| 2014/0032219 | A1 | 1/2014 | Lemer |
| 2014/0100975 | A1 | 4/2014 | Van |
| 2014/0115710 | A1 | 4/2014 | Hughes |
| 2015/0073951 | A1 | 3/2015 | Ladd |
| 2015/0195406 | A1 | 7/2015 | Dwyer |
| 2015/0281446 | A1 | 10/2015 | Milstein |
| 2015/0324592 | A1 * | 11/2015 | Dutta .................... G06F 21/602 |
| | | | 713/165 |
| 2016/0196440 | A1 | 7/2016 | O'Hare |
| 2016/0234175 | A1 * | 8/2016 | Zhao ................... H04L 63/0428 |
| 2016/0379010 | A1 | 12/2016 | Farkash |
| 2017/0026516 | A1 * | 1/2017 | Westlake ............ H04M 3/5183 |
| 2017/0162187 | A1 | 6/2017 | Ohtani |
| 2021/0194939 | A1 | 6/2021 | Forsyth et al. |

OTHER PUBLICATIONS

Blackwell, Clive, The management of online credit card data using the Payment Card Industry Data Security Standard, Nov. 2008, Third International Conference on Digital Information Management, pp. 838-843 (Year 2008).

* cited by examiner

METHOD AND APPARATUS FOR PROTECTING SENSITIVE DATA

CROSS-REFERENCE TO RELATED APPLICATIONS

The present application is a continuation of U.S. non-provisional patent application Ser. No. 16/449,316 titled "Method and Apparatus for Protecting Sensitive Data" and filed on Jun. 21, 2019 which claims the benefit of U.S. Provisional Patent Application No. 62/688,380, titled "METHOD AND APPARATUS FOR PROTECTING SENSITIVE DATA" and filed on Jun. 21, 2018, U.S. Provisional Patent Application No. 62/699,730, titled "METHOD AND APPARATUS FOR PROTECTING SENSITIVE DATA" and filed on Jul. 17, 2018; and U.S. Provisional Patent Application No. 62/717,772 titled "METHOD AND APPARATUS FOR PROTECTING SENSITIVE DATA" and filed on Aug. 10, 2018—which are each hereby incorporated by reference in their entirety and for all purposes.

SUMMARY

In accordance with one embodiment, a method of modifying data in a telecommunication system can be implemented by receiving a communication comprising voice data and non-voice data at a first processor; sending the non-voice data from the first processor to a second processor; sending the voice data from the first processor to a third processor; receiving a sensitive-data-alert-message at the second processor from a fourth processor; and, in response to the sensitive-data-alert-message from the fourth processor, producing a set of modified-non-voice data at the second processor by removing a set of sensitive data contained within the non-voice data.

Further embodiments will be apparent to those of ordinary skill in the art from a consideration of the following description taken in conjunction with the accompanying drawings, wherein certain methods, apparatuses, and articles of manufacture are illustrated. This Summary is provided to introduce a selection of concepts in a simplified form that are further described below in the Detailed Description. This Summary is not intended to identify key features or essential features of the claimed subject matter nor is this Summary intended to be used to limit the scope of the claimed subject matter. Other features, details, utilities, and implementations of the claimed subject matter will be apparent from the following more particular written Detailed Description of various embodiments as further illustrated in the accompanying drawings and defined in the appended claims.

BRIEF DESCRIPTION OF THE DRAWINGS

A further understanding of the nature and advantages of the present technology may be realized by reference to the figures, which are described in the remaining portion of the specification.

DETAILED DESCRIPTION

Figure 1:
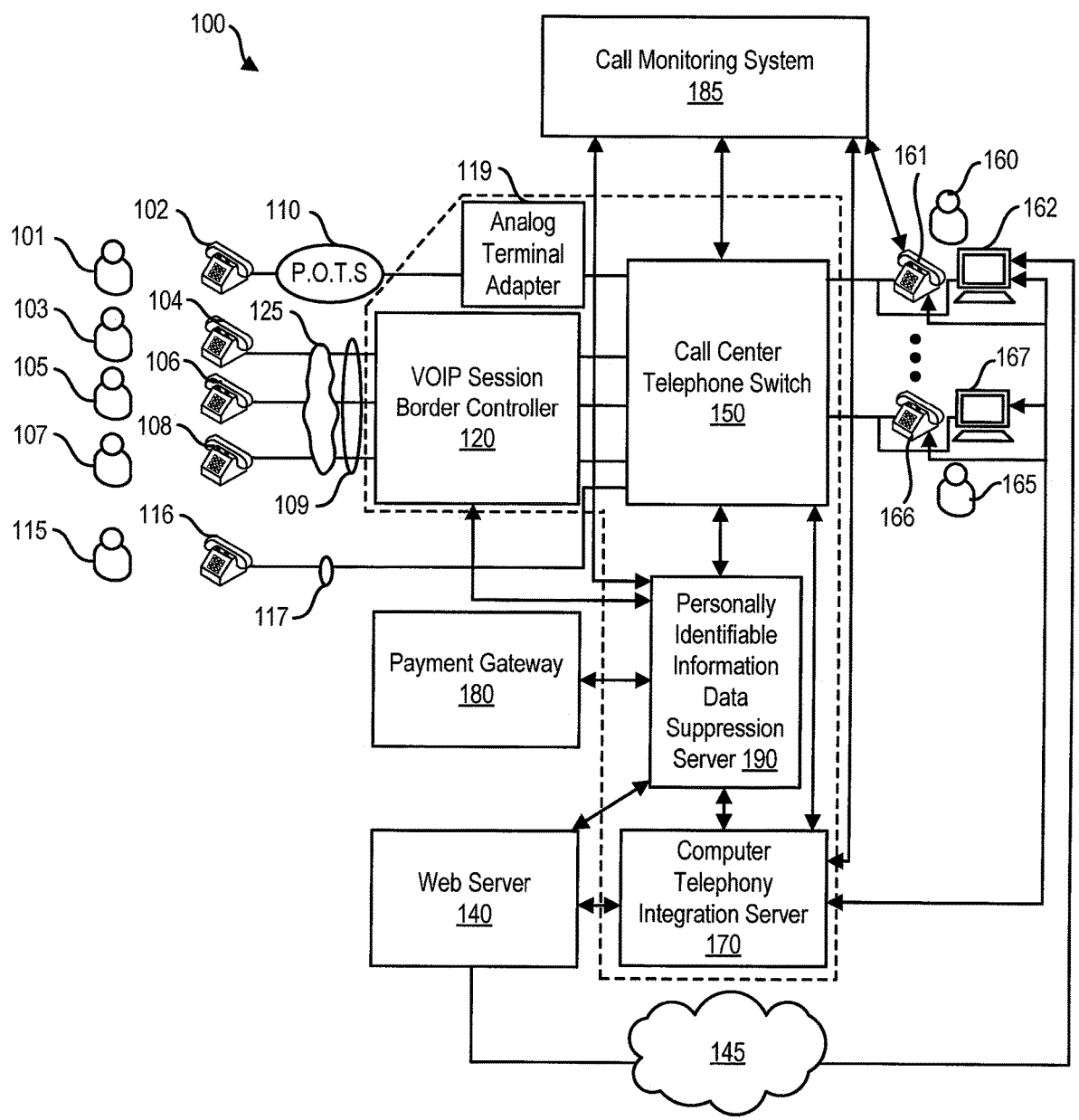
FIG. 1 illustrates an example of a telecommunications system in accordance with one embodiment.

Consumers frequently give sensitive data, such as their credit card information, to call center agents during a transaction. Sensitive data can include confidential information, private financial information, or private health information, for example. One category of sensitive data has become known as Personally Identifiable Information (PII) data. This data can include a user's social security number, date of birth, credit card information, and PIN numbers, for example. With respect to the Payment Card Industry-Data Security Standard (PCI-DSS), for example, this data can include cardholder information, such as the full PAN, cardholder name, expiration date, service code, validation codes/values, full track data, PINs and PIN blocks. While in the past it has been common for consumers to provide this information verbally during a call with a live agent (i.e., by spoken word) or by typing in numbers on a handset (which are then communicated as Dual Tone Multi Frequency (DTMF) transmissions) when utilizing an Interactive Voice Response (IVR) system, the growth of consumer fraud has given consumers concerns about openly providing such information. Namely, a dishonest call center agent might keep a copy of the PII data when the information is recited over the phone. Even the entry of DTMF tones via the user's handset can be recorded and converted to actual numbers by a receiving party. Thus, a dishonest call center agent might record the DTMF tones and convert them to actual numbers. Additionally, when consumers are in "open air" environments such as on public transportation or at a coffee shop, providing PII data verbally can expose this sensitive data to anyone within close proximity. Thus, not only is sensitive data at risk when entered via existing systems, but also consumers are hesitant to provide it verbally.

Moreover, in a call center environment, it is not uncommon for a call center to utilize call monitoring systems or agents. Call monitoring (sometimes referred to as quality monitoring) is often implemented by recording a conversation between a caller and a call center agent. The quality monitoring agent then reviews the interaction between caller and call center agent to assess quality. To prevent the PII data from being recorded and stored on physical media, the call monitoring or recording is often paused during PII data collection so that the PII data is not recorded. Thus, quality monitoring is interrupted to some degree in present systems.

In addition, some financial and privacy regulations or standards govern the storage of sensitive data, such as PII data. One example is the Payment Card Industry Data Security Standard (also referred to herein as PCI-DSS) that requires any device that receives PII data to satisfy the PCI-DSS standard. A device is referred to as being "in scope" with the PCI-DSS if the device receives PII data. In accordance with some standards, such as PCI-DSS, it is improper to retain PII data longer than is necessary to accomplish a task for which the PII data was submitted by a consumer. In such an instance, it can be a violation of the terms and conditions of the standards, if PII data is retained when no longer needed. Other examples of regulating standards are HIPPA and FFIEC. A standard, regulation, or other defined set of conditions that defines the requirements for protecting sensitive data from unauthorized disclosure is referred to herein as a sensitive data security standard.

In accordance with one embodiment described herein, sensitive data, such as PII data, that is submitted by a caller can now be suppressed at a call center location before the PII data is conveyed beyond the call center (e.g., outside the PCI-DSS scope applicable to the call center) to a call center agent's telephone or computer. This embodiment will be described using PII data as the sensitive data; but, the example applies equally to all types of sensitive data.

When others have tried to suppress PII data in the past, they have had to rely upon physically terminating a call and then re-generating the call with selected PII data removed. This process of having to physically terminate a call and then physically regenerate the call introduced multiple opportunities for communication to be lost. Moreover, it required physical equipment for each communication line. For a large call center (e.g., one having hundreds of call center agents), such physical equipment could be quite expensive. And, the maintenance and troubleshooting of the physical equipment could be difficult and expensive, as well.

Another way in which others tried to suppress PII data was to outfit each call center agent computer with a hardware device that could be used to suppress data. However, the use of such devices can be easily subverted by a dishonest call center agent. Moreover, hardware devices were required for the computer/telephone of each call center agent at a call center. Again, such a system is difficult to maintain and troubleshoot. Furthermore, trying to make all the computers of a large call center PCI-DSS compliant would be an extremely costly and difficult task.

FIG. 1 illustrates an example of a telephone system 100 in which a telephone caller can submit sensitive data, such as PII data, and in which at least a portion of the sensitive data can be suppressed. The system does not require a call to be physically terminated and then re-generated; and, it does not require special add-on hardware devices to be used at the call center agent's computer. In FIG. 1, a call center takes calls from a variety of consumers. The calls are handled by call center agents who field questions from the callers, e.g., via a customer relationship management (CRM) system, implemented by web server 140, for example. While the consumers are referred to as "callers" in this example embodiment, it should be appreciated that some correspondence might emanate from a consumer's computer. In that instance the computer is also considered a caller. One example of this is an instant message (IM) that is sent to a computer used by a call center agent.

As part of the interaction in FIG. 1 between the callers and the call center agents, a caller will sometimes submit PII data. The caller might do this by speaking the numbers of a credit card, for example, in which case the spoken PII data constitutes PII data. Or, the caller might do so by using the touch-tone keys of a telephone, in which case the dual tone multi-frequency tones generated by the telephone constitutes PII data. Similarly, the caller might do so by entering the numbers via a computer interface and implementing a submit operation, in which case the digital embodiment of the numbers constitutes PII data.

When entered by machine, the numbers are often conveyed from a sender's transmitter as dual tone multi frequency tones. Such tones can be identified by a receiver and converted into the original numbers. Each number between 0 and 9, as well as any available wildcard characters are assigned a particular dual tone multi frequency. Such DTMF transmissions in the telephony environment are readily understood by those of ordinary skill in the art. When entered in other ways, applicable recognition systems can be utilized. For example, a voice recognition system (or voice recognizer) could be used to recognize spoken numbers.

The call center can receive incoming communications from a variety of callers. FIG. 1 shows caller 101 who uses handset 102 and the plain old telephone system (P.O.T.S.) network 110 to communicate with a call center telephone switch 150. An analog terminal adapter (ATA) 119, for example, can be used to convert the analog signal from the POTS network to a digital signal. FIG. 1 is simplified to show elements of a communication system; but, a person of ordinary skill in the art will appreciate that some intermediary devices might not appear for purposes of clarity. Similarly, callers 103, 105, and 107 communicate via their respective telephone handsets 104, 106, and 108. These callers use Voice Over IP (VOIP) devices to communicate via Session Initiation Protocol (SIP) via SIP trunk lines 109, for example, with a VOIP session border controller 120. The VOIP session border controller 120 receives the calls via a communication network 125, such as the internet, and can pass the calls to the call center telephone switch 150. Similarly, caller 115 can use handset 116 to send a communication across a digital transmission line 117, such as a T-1 line, to the call center telephone switch 150. The callers shown in FIG. 1 are some examples of different callers. Other types of communication schemes can be implemented between callers and the call center telephone switch, as well, as would be appreciated by one of ordinary skill in the art.

The VOIP session border controller can reside at a call center along with other portions of the call center equipment. A PII Data Suppression Server 190 can be communicatively coupled with the VOIP session border controller. In the embodiment shown in FIG. 1, the PII Data Suppression Server can provide the VOIP session border controller with an instruction to watch for PII data, for example.

The call center telephone switch 150 connects (e.g., communicatively couples) a particular caller with a particular call center agent. FIG. 1 shows a series of call center agents. Each agent can have a telephone as well as a computer that is communicatively coupled with the call center telephone switch. For example, FIG. 1 shows a first call center agent 160 who has a telephone handset 161 and computer 162. Also, shown is call center agent 165 who has a telephone handset 166 and computer 167. The number of call center agents can vary from business to business. For example, a large credit card issuer can utilize several call centers located throughout the country or the world and utilize hundreds of call center agents at each call center. A smaller business might only require a few call center agents.

The call center telephone switch 150 can be programmed to follow a set of rules that indicates which call center agent should handle a call from a particular caller. For example, the call center telephone switch can route an incoming call to an appropriate call center agent based upon characteristics of the incoming call, such as automatic number identification (ANI). One example of a call center telephone switch is an automatic call distributor (ACD). In FIG. 1, the call center telephone switch is shown communicatively coupled with a call monitoring system 185, a VOIP session border controller 120, a PII Data Suppression Server 190, and a computer telephony integration (CTI) server 170, and equipment used by call center agents.

FIG. 1 also shows a computer telephony integration (CTI) server 170. The computer telephony integration server can be programmed to provide further enhancements to the functionality of the call center telephone switch. For example, the CTI server can be programmed to assist with call routing based on an incoming caller's telephone number or automatic number identification. The CTI server can also be used for call reporting. And, the CTI server can be used for voice recording integration so as to use data from the CTI server to enhance the voice messaging provided to a caller on an incoming call. Moreover, the CTI server can keep track of which incoming line is in communication with which call center agent and that agent's respective computer and telephone line. By monitoring the activity of an agent, the CTI server can help determine when sensitive data, such as PII data, is about to be provided by a user. In FIG. 1, the CTI server is shown communicatively coupled with the call monitoring system 185, the call center telephone switch 150, the PII Data Suppression Server 190, and the web server 140, as well as the phones and computers of the call center agents.

FIG. 1 also shows a payment gateway 180. The payment gateway can be a secure server located remotely from a call center and used to process payments received via the call center. For example, the payment gateway can be a credit card processing center that processes payment information submitted by a cardholder and that verifies that the cardholder's credit card account has sufficient credit for the desired purchase. In the example of FIG. 1, the payment gateway is shown communicatively coupled with the PII Data Suppression Server 190, from which the payment gateway can receive PII data.

FIG. 1 also shows a call monitoring system 185, sometimes referred to as a quality monitoring system. The call monitoring system can be used to monitor the conversations that call center agents have with callers. During a call, a conversation between a caller and an agent can be recorded for later playback or transcription or even monitored during live conversations. The quality monitoring system can monitor a call by being communicatively coupled to a call via the call center telephone switch 150. The call monitoring system 185 can receive commands from the computer telephony integration server 170 or the PII Data Suppression Server directing a monitoring session to begin, end, pause, and/or re-start.

FIG. 1 also shows a Personally Identifiable Information (PII) Data Suppression Server 190. The PII Data Suppression Server 190 can include a processor that runs software to cause the suppression of PII data provided by a caller to a call center. In this example, the PII Data Suppression Server 190 is shown as a separate device. However, it should be appreciated that the PII Data Suppression Server could similarly reside as part of the VOIP session border controller 120, as part of the call center telephone switch 150, and/or as part of the computer telephony integration server (CTI Server) 170. It should be appreciated that in other embodiments, the PII Data Suppression Server 190 might be used to suppress sensitive data other than PII data.

In the embodiment shown in FIG. 1, the PII Data Suppression Server 190 is communicatively coupled with the call center telephone switch 150, the CTI server 170, the payment gateway 180, the VOIP session border controller 120, a web server 140 (such as a customer relationship management web server), and the call monitoring system 185.

In this embodiment, the CTI server alerts the PII Data Suppression Server that a call has been received by a call center agent. Also, the web server detects or is informed that a sensitive field, such as a payment field, has been activated on the agent's computer. This indicates that PII data is about to be entered. The inputs from the CTI Server 170 and web server 140 thus alert the PII Data Suppression Server 190 that PII data is about to be provided by a caller communicatively coupled with that call center agent. The PII Data Suppression Server can instruct the VOIP session border controller 120, the call center telephone switch 150, or a router (not shown) positioned on the call-center-agent-side of the call center telephone switch to suppress PII data provided by the caller. For example, when a caller enters numbers via a keypad at the caller's phone or computer and the call is implemented via a Voice Over IP (VOIP) protocol, the entered numbers will be conveyed as data packets to the VOIP session border controller 120. The number data provided by the caller will be divided up and sent by a series of packets, wherein each packet includes as payload data a portion of the number data. For example, each packet will include header information that identifies whether that packet contains a portion of the number data. Thus, by identifying the packets that contain number data during the relevant time period, the VOIP session border controller can in turn intercept and suppress sensitive PII data before the sensitive PII data reaches the call center telephone switch.

The PII Data Suppression Server needs to know when to instruct a device in the communication system to look for PII data. A caller may certainly enter numbers during a call that are not PII data, and those entered numbers do not need to be suppressed. Thus, various triggering events can be used to alert the PII Data Suppression Server that PII data is about to be entered in an on-going communication. One way to trigger the PII Data Suppression Server to implement screening for entered PII data is to signal the PII Data Suppression Server when a web server, such as web server 140 in FIG. 1, serves a payment web page to a call center agent's computer, such as computer 162 or 167 in FIG. 1. The serving of the payment web page is an indicator that payment information is about to be received. Similarly, the serving of other web pages associated with PII data could be indicators, as well. Thus, the web server 140 can notify the PII Data Suppression Server when such a payment page is served by the web server.

Another way to trigger the PII Data Suppression Server to implement screening is when a computer of a call center agent associated with a call activates a graphical user interface for the reception of PII data, such as the reception of credit card information. When such a graphical user interface is launched, for example, a signal can be sent by the call center agent's computer to the PII Data Suppression Server, e.g. via the web server in order to alert the PII Data Suppression Server that the caller is about to provide PII data.

In another embodiment, a triggering signal might be generated by a call center agent's computer when the call center agent moves a cursor or other pointing device into an area of a graphical user interface that indicates PII data is about to be provided. Once again, the web server can be notified and in turn can notify the PII Data Suppression Server. In some embodiments, the web server and CTI server can be combined together.

In response to the triggering signal, the PII Data Suppression Server can communicate with one of the communication devices in the network. For example, the PII Data Suppression Server can instruct that particular communication device to identify packets that have header information designating a payload as containing number information. Depending on the system capabilities and the type of incoming phone line, the PII Data Suppression Server can signal, for example, a VOIP session border controller 120, a call center telephone switch, or a router positioned on the call-center-agent-side of the call center telephone switch to suppress data.

To suppress the number data, a communications device, such as the VOIP session border controller, can simply replace the received number data with replacement data. For example, the VOIP session border controller can replace the received number data in the VOIP packets with data representing a neutral tone. The revised VOIP packets can then be forwarded from the VOIP session border controller to the call center telephone switch. The call center telephone switch processes the revised VOIP packets as usual so that the call center agent assigned to the call will merely hear the neutral tones. In this fashion, the call center agent is not exposed to the PII data. Thus, there is no risk that a dishonest call center agent could record actual tones and could translate the recorded tones to actual PII data. Alternatively, rather than a neutral tone, the communication device, such as the VOIP session border controller, could replace the intercepted number data with data representing a silent tone.

As explained further below, the communication device need not replace all the intercepted number data with replacement data. Rather, the communication device could be instructed to merely replace some of the intercepted digits. The remaining digits can be conveyed unadulterated further downstream in the communication network and even to the call center agent. For example, if the first 12 digits of a credit card number are replaced with a neutral tone and the last four digits are actual numbers from the credit card number, the call center agent will be able to hear when the caller is almost finished entering the credit card number. This helps to speed up the processing of the call, as the agent is alerted to continue with the process at hand. Moreover, it allows the agent to query the customer if a long delay without an entering of a digit indicates that the customer appears to be having trouble entering the digits.

Figures 2A, 2B:
FIG. 2A illustrates an example of a user interface for the suppressing of sensitive data in accordance with one embodiment.
FIG. 2B illustrates an example of a user interface for the suppressing of sensitive data in accordance with another embodiment.

In addition, the PII Data Suppression Server can instruct a server, such as the web server 140 or CTI server having a resident web server, to notify the computer of the call center agent that number data has been received. For example, FIG. 2A shows an example 200 of a user interface for a call center agent. When the time comes during a call for a call center agent to request payment information from a caller, the graphical user interface shown in FIG. 2A is activated. The web server receives confirmation from the PII Data Suppression Server that a number has been received and in turn alerts the agent's computer that a number has been entered by the caller. The graphical user interface of the call center agent's computer in response displays an "*" or some other character in the credit card information box in order to alert the call center agent that a number has been entered by the caller. This signaling of the entering of information (without displaying all the actual information) helps to keep the call center agent informed as to what is taking place. Thus, if a consumer does not begin entering data or does not enter all the data, the agent can see this visually and prompt the consumer accordingly.

FIG. 2B illustrates an example of a user interface where social security information is being entered. In this example, a portion of the social security number data and birth date data is suppressed. If desired, some received numbers can be passed unadulterated from the PII Data Suppression Server to the call center agent computer, as is apparent with the "5" and "4" numbers in FIG. 2B.

In another embodiment, when the PII Data Suppression Server receives a number, the PII Data Suppression Server can alert the web server 140 that the number has been received. In this embodiment, the web server can then refresh the page that was served to the call center agent's computer and reflect the fact that a number has been received, for example with an "*" in the received number field of the web page.

In accordance with one embodiment, FIG. 2A shows that not all of the credit card data needs to be suppressed. For example, the last four digits of the caller's credit card number can be displayed to the call center agent via the graphical user interface. This partial listing helps the agent confirm that number data has been correctly entered, without running afoul of privacy regulations. Similarly, FIG. 2A shows that a call center agent can ask a caller for the expiration date of her credit card. FIG. 2A also shows that the Card Security Code (CSC or CVV) information, once entered, can be disguised but indicated on the graphical user interface displayed to the call center agent. It should be appreciated that in some embodiments, one might choose to suppress PII data by keeping all of the PII data disguised. In other embodiments, one might choose to suppress PII data by disguising only a portion of the PII data.

FIG. 1 also shows a caller 101 whose telephone handset 102 is communicatively coupled with the call center telephone switch via the plain old telephone switch network 110. Such a system conveys analog signals to the call center telephone switch. Therefore, the VOIP session border controller cannot be used to suppress any data, as no VOIP packets are used for an analog line. The call center telephone switch 150 can be programmed to screen for and identify number data. A call center telephone switch 150 can be programmed via its application programming interface (API) to use a signal detector, such as a DTMF signal detector that detects DTMF signal data. For example, a device media controller could be used to identify incoming DTMF data. The PII Data Suppression Server 190 can instruct the call center telephone switch when to transmit PII data to the PII Data Suppression Server, for example, and which PII data to suppress before forwarding data to the call center agent's phone. In many instances, the PII Data Suppression Server will instruct the call center telephone switch to forward all PII data to the PII Data Suppression Server as that data is received and to suppress all of the PII data so that it is not passed along to a call center agent's phone.

FIG. 1 also shows a caller 115 whose handset 116 is communicatively coupled via a digital transmission line such as a T-1 transmission line to the call center telephone switch 150. Such a system conveys digital signals to the call center telephone switch—but not necessarily VOIP protocol signals. Once again, the call center telephone switch can be programmed to screen for number data. For example, a device media controller could be used to identify incoming DTMF data. Thus, the call center telephone switch can intercept and suppress number data when appropriate. The PII Data Suppression Server 190 can instruct the call center telephone switch when to look for PII data to intercept, suppress, and pass along to the PII Data Suppression Server, for example, so that the data is not passed to a call center agent's phone. And, the call center telephone switch can utilize a DTMF detector, such as a device media controller to identify the DTMF data that the call center telephone switch receives.

As number data is intercepted by one of the various communication devices, such as a VOIP session border controller, a call center telephone switch, or a router, the intercepted number data can be sent from the communication device to the PII Data Suppression Server. The PII Data Suppression Server can then accumulate the PII data and pass the data to a payment server at an appropriate time. The PII Data Suppression Server may also obtain non-sensitive data from the CTI server or web server, for example, that can be used as part of a payment event—such as the amount of funds being used for a purchase. Thus, a communication device can be instructed to not only suppress sensitive data so that the sensitive data is not passed on to a call center agent but also to relay the sensitive data to the PII Data Suppression Server for secure processing.

In accordance with one embodiment, sensitive data intended for a call center can be physically contained or secured so as to be within scope of applicable standard(s). For example, the PCI-DSS standard requires that PII data be maintained securely by devices that are PCI-DSS compliant. In a call center environment where many hundreds of call center agents work, it can be untenable to make sure that all of the call center agents' computers and telephones are compliant with the PCI-DSS standard or some other standard. Thus, the embodiment discussed in FIG. 1 is useful in that it reduces the number of devices that need to be within the scope of the PCI-DSS standard or some other standard. FIG. 1 shows a dashed line surrounding the VOIP session border controller server 120, the call center telephone switch 150, the CTI server 170, and the PII Data Suppression Server 190. In the example of FIG. 1, the devices surrounded by the dashed line can be maintained as PCI-DSS standard compliant, while the rest of the communication system need not be. This provides an enormous cost saving to a call center in that it eliminates the tremendous effort that would be required to make all of the call center agents' devices PCI-DSS standard compliant, if they received PII data. Moreover, it makes the system more secure and protects the data of consumers. In view of the highly publicized data breaches that have occurred in recent years, the disclosed embodiment serves an important purpose in protecting sensitive data. It should be noted that these devices within the dashed line can all be located within a secure facility, such as a secure server room at a call center, in order to implement physical security.

It should be noted that the system shown in FIG. 1 could be used to store PII data in the call center for a limited period of time that is warranted. PII data may need to be stored temporarily so that it can be relayed to a payment gateway; but, once the PII data is no longer needed, it should be deleted. The implementation described in FIG. 1 permits this as the communication of the PII data can be limited to a few highly-secured devices and then deleted when no longer needed. Moreover, the PII data can be retained in the registers of a processor of the PII Data Suppression Server without saving the PII data to a storage device. This helps to prevent the unnecessary storage of the PII data. For example, it prevents the storage of transient PII data to a physical storage device before handing off the PII data to an adjunct process. Stated another way, it prevents the non-register storage of PII data before handing off the PII data to an adjunct process.

Figure 3:
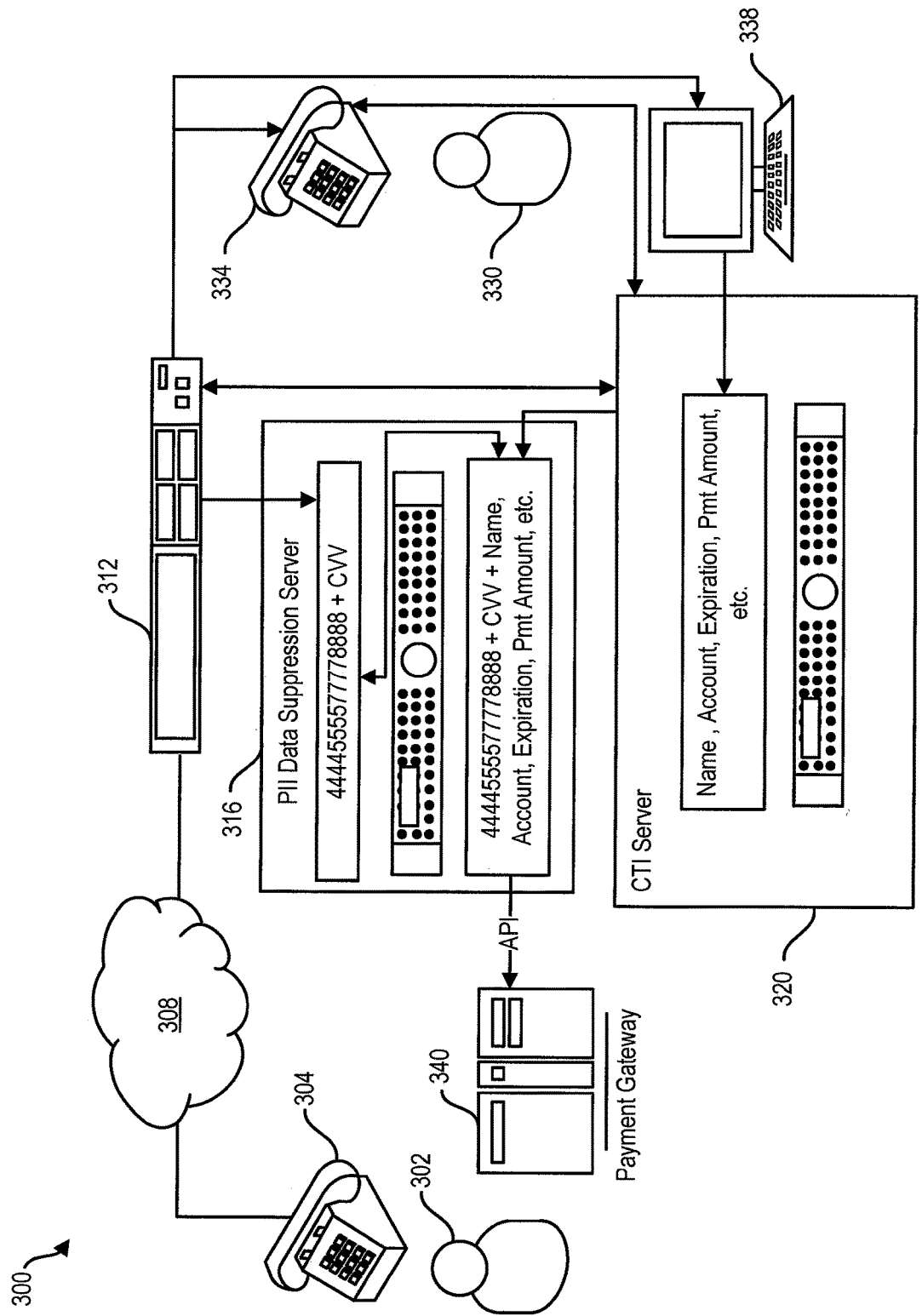
FIG. 3 illustrates an example of a telecommunications system for suppressing sensitive data in accordance with one embodiment.

FIG. 3 illustrates an example system 300 that shows how PII data can be conveyed. In system 300, a caller 302 utilizes a communication device, such as a telephone handset 304, to communicate across a network 308 with a call center telephone switch 312, such as an automatic call distributor (ACD). The call center telephone switch is communicatively coupled with a computer telephony integration (CTI) server 320. The call center telephone switch distributes incoming calls to various call center agents, such as call center agent 330. Call center agent 330 uses a communication device, such as telephone 334, and a computer, such as computer 338, which are communicatively coupled with the CTI server 320. Also shown as part of the system in FIG. 3 is a PII Data Suppression Server 316 and a payment gateway 340, each of which is communicatively coupled with the CTI server. In the embodiment of FIG. 3, a web server can be incorporated with the CTI server.

In the embodiment of FIG. 3, the PII Data Suppression Server instructs the call center telephone switch to look for PII data to intercept. The call center telephone switch can identify any incoming data that represents DTMF tones whether in a digital or analog incoming signal. For example, the call center telephone switch can be instructed by the PII Data Suppression Server to use the call center telephone switch's device media controller to listen for DTMF tones sent by a particular caller, regardless of whether the incoming signal is delivered via SIP, POTS, or T-1. The intercepted PII data is conveyed from the call center telephone switch to the PII Data Suppression Server. Via an application programming interface (API), the PII Data Suppression Server sends the intercepted PII data to a payment gateway. The PII Data Suppression Server also instructs the CTI server to alert the call center agent's computer that PII data has been—or is being—received. However, the CTI server and PII Data Suppression Server do not convey the entire set of PII data to the call center agent's computer. Instead, at least a portion of the PII data is suppressed by disguising that portion of the PII data so that the call center agent cannot determine the entire set of PII data. When a portion of the PII data is left undisguised during suppression, the call center agent can see whether numerical data, for example, is being entered correctly. For example, by not disguising the first few numbers of a credit card number, the call center agent can verify that an appropriate number is being entered for a particular type of card—e.g., Visa credit card account numbers start with a "4." Once the call center agent has confirmed that the appropriate amount of data has been submitted by the caller, the call center agent can submit the data via clicking on a submit icon, for example. This submission signals the CTI server to pass non-PII data, such as payment amount, to the PII Data Suppression Server. The PII Data Suppression Server merges the non-PII data with the PII data held by the PII Data Suppression Server register(s) and transmits the complete set of data to the payment gateway. Once payment is processed, the PII data can be discarded from the processor registers of the PII Data Suppression Server. Again, this example uses a CTI server that has a resident web server for communicating with the call center agent's computer.

It should be appreciated that the PII Data Suppression Server can retain PII data in its register(s) for a short period of time in order to allow the data to be re-used, as necessary. For example, when a travel agency processes credit card information for an airline reservation, the data can be retained for use in also making a hotel reservation. This avoids the process of asking the consumer to re-enter the credit card information for each reservation that is made during the call.

Figure 4:
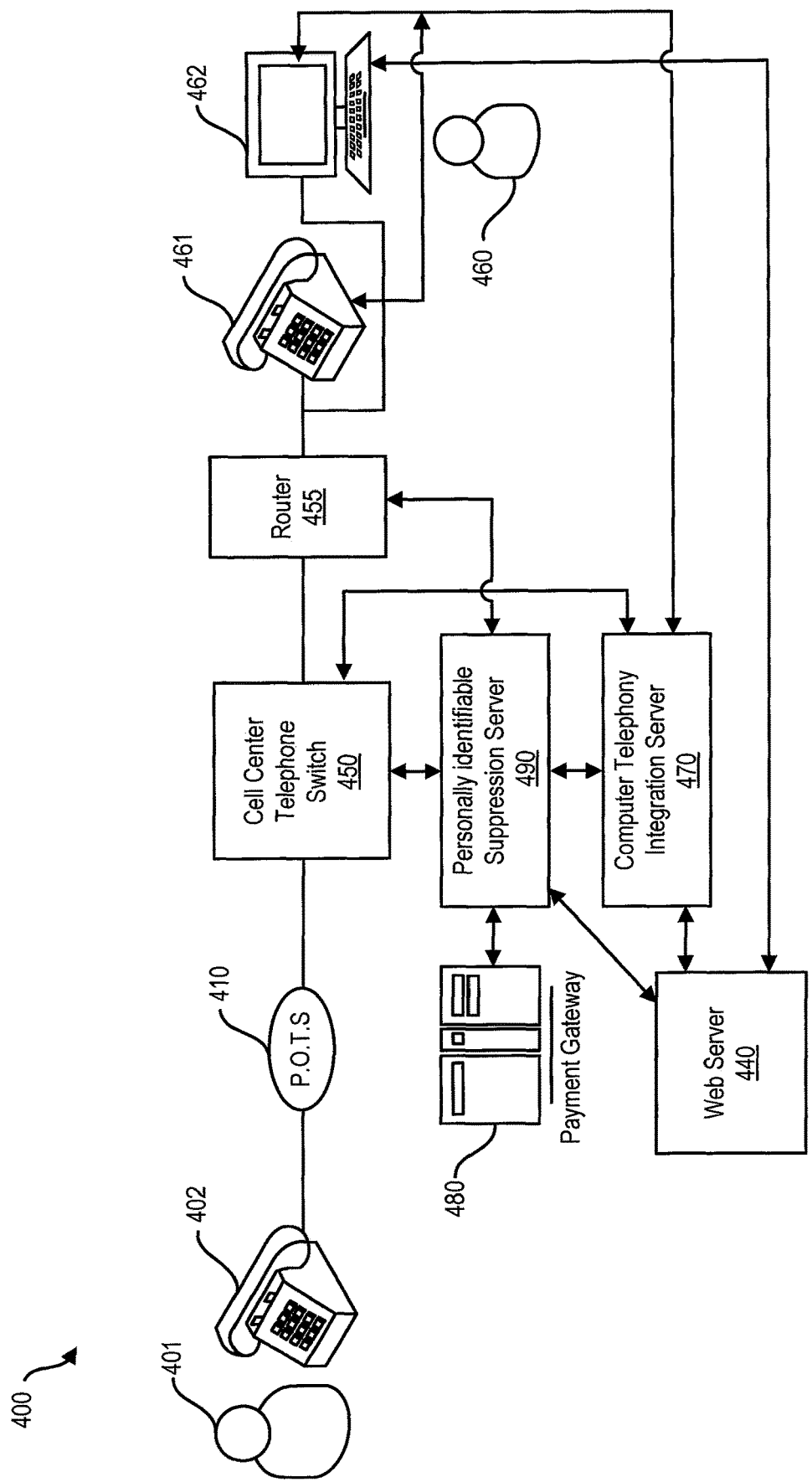
FIG. 4 illustrates an example of a telecommunications system for suppressing sensitive data in accordance with another embodiment.

FIG. 4 illustrates an embodiment for suppressing sensitive data, such as PII data. In this example, a caller 401 places a call via a handset 402. The call is routed via an analog line and via the Plain Old Telephone System (POTS) network 410. A call center telephone switch 450 receives the incoming analog signal and converts it to a VOIP outgoing signal. This allows the call center telephone switch to route the call via an internal VOIP network, for example. The outgoing signal is routed through router 455 to call center agent 460 via handset 461 or computer 462. FIG. 4 also shows a computer telephony integration server 470, a PII Data Suppression Server 490, a web server 440, and a payment gateway 480.

In one embodiment, the router is programmed to do a packet analysis in order to intercept all packets that contain DTMF data. As the DTMF data is received and suppressed, it is forwarded to the PII Data Suppression Server. If the PII Data Suppression Server has been notified that a payment event is taking place, then the PII Data Suppression Server can maintain the data in safe keeping. If a PII data operation is not taking place, the PII Data Suppression Server can pass the data to the web server which can pass it to the call center agent's computer.

In one embodiment, when a triggering event occurs that indicates that sensitive data is about to be sent, e.g., as described herein, the PII Data Suppression Server 490 can instruct the router 455 to suppress the sensitive data. For example, this can be accomplished by instructing the router to identify packets that contain numerical data, removing the numerical data, and forwarding on nonce data in place of the numerical data. This embodiment is useful when a call center telephone switch is not equipped to suppress data by itself. Preferably, this implementation would physically locate the router within an area that is PCI-DSS compliant so as to be in conformance with that standard, if the PCI-DSS standard is being implemented.

In an alternative embodiment, the call center telephone switch might not be able to suppress the DTMF data but could be able to identify and forward the DTMF data. In such an instance, the call center telephone switch could be programmed to forward the intercepted numerical data to the PII Data Suppression Server 490 while the router would perform the function of suppressing the numerical data. For example, the router could be programmed with an access control list on the configuration of the router to cause the router to do packet analysis of any packets coming from the call center telephone switch and strip out any DTMF data from those packets.

Figure 5:
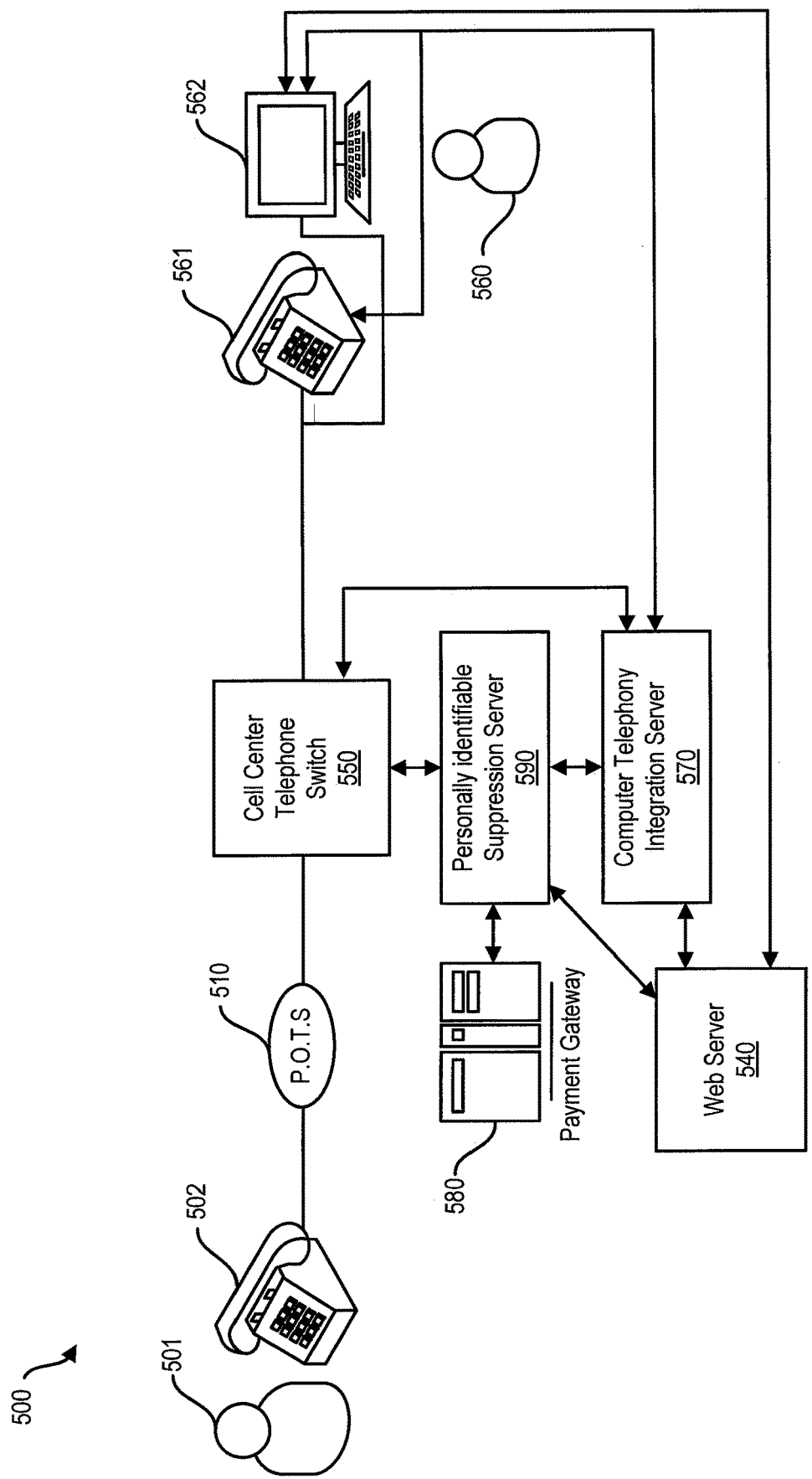
FIG. 5 illustrates an example of a telecommunications system for suppressing sensitive data in accordance with yet another embodiment.

FIG. 5 illustrates an embodiment for suppressing sensitive data in a system where the communication is sent via analog communication lines. In FIG. 5, a caller 501 makes a call via handset 502 and via the plain old telephone system 510. The communication is carried by analog lines to the call center telephone switch 550. The call center telephone switch routes the call via an analog communication line to a call center agent 560 via a telephone handset 561 and/or via a computer 562.

When a triggering signal is received by a PII Data Suppression Server 590 indicating that sensitive data is about to be entered, e.g., as described herein, the PII Data Suppression Server can instruct the call center telephone switch to mute part of the sensitive data. For example, the call center telephone switch can detect DTMF tones for each of the transmitted digits. The call center telephone switch can mute some of these tones by replacing the tones with no tone or a neutral tone. Thus, the call center agent is prevented from hearing all of the tones. The complete string of characters can be sent to the PII Data Suppression Server by the call center telephone switch. The PII Data Suppression Server can then pass the PII data to the payment gateway. The web server 540 could be pre-programmed only to show all placeholder values, such as an asterisk, or a combination of actual numbers and placeholder values on the call center agent's computer. This allows the call center agent to follow the entry of the sensitive data without the system having to disclose all of the sensitive data to the call center agent. This practice could similarly be employed by a quality monitoring system. The system can be flexible as to which of the numbers in a string of numbers are muted.

Figure 6:
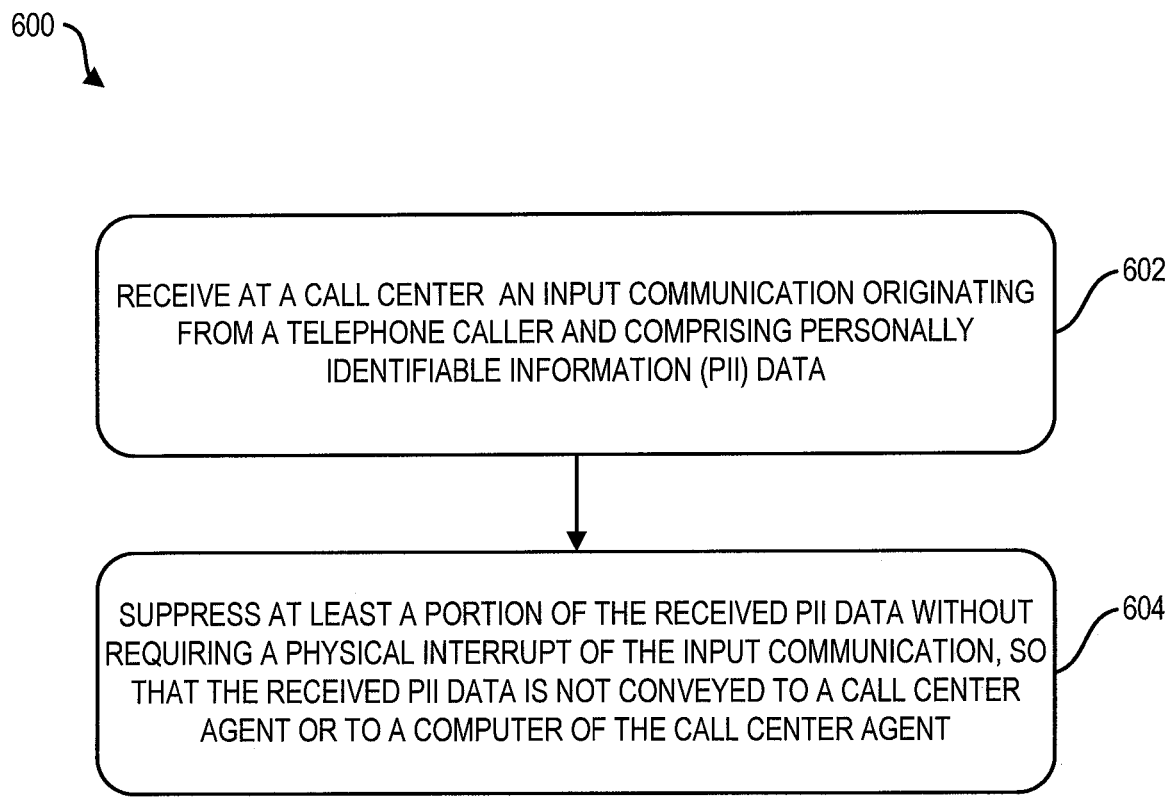
FIG. 6 illustrates a flow chart 600 that demonstrates a method of suppressing sensitive data in accordance with one embodiment.

FIG. 6 illustrates a flow chart 600 that demonstrates a method of suppressing sensitive data in accordance with one embodiment. In operation 602, a call center receives an input communication. The input communication originates from a telephone caller and comprises personally identifiable information (PII) data. In operation 604, at least a portion of the received data is suppressed. For example, at least a portion of the received PII data is suppressed without requiring a physical interrupt of the input communication. In this manner, any suppressed data is not conveyed to a call center agent or to a computer of a call center agent.

Figure 7:
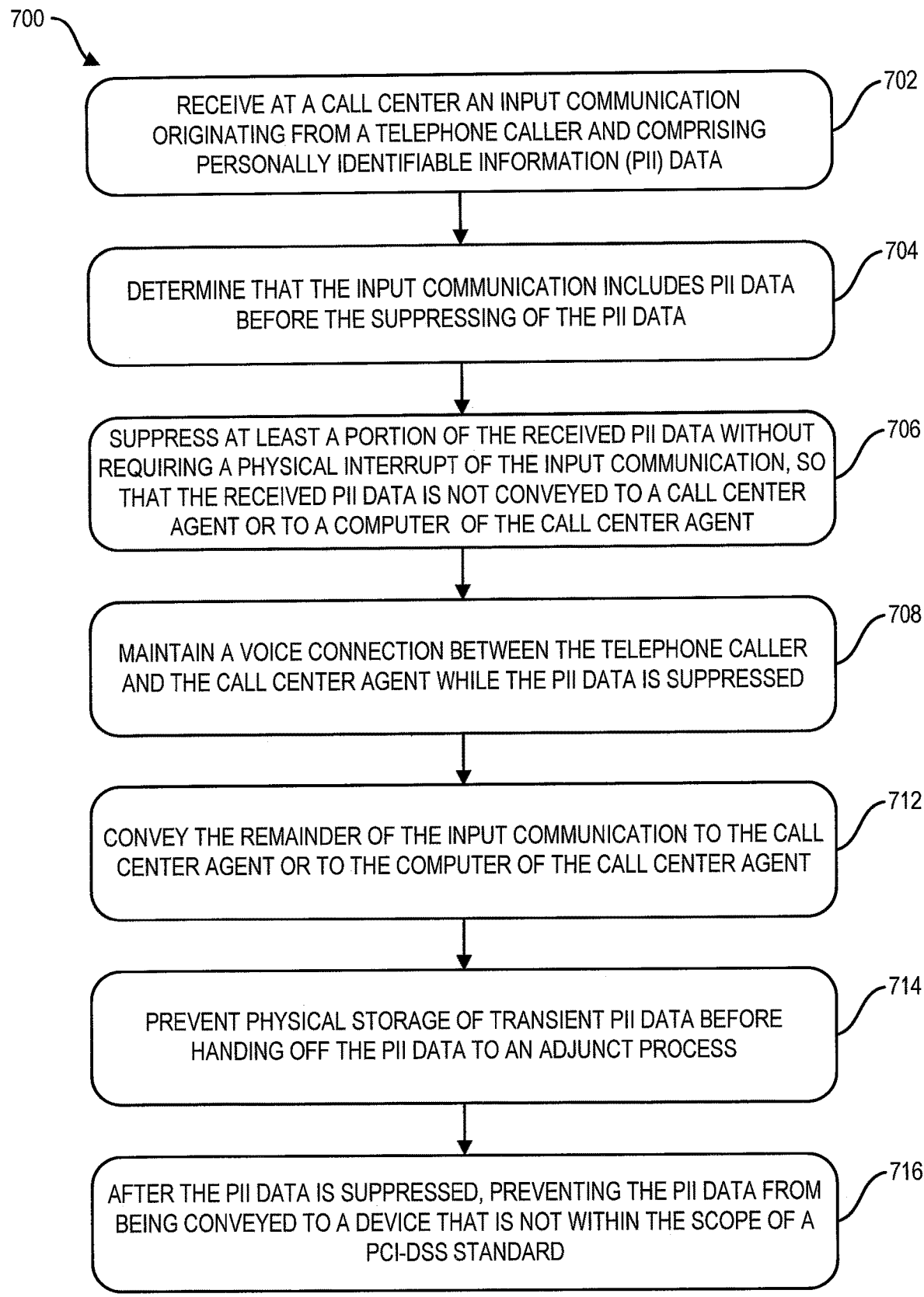
FIG. 7 illustrates a flow chart that demonstrates a method of suppressing sensitive data in accordance with another embodiment.

FIG. 7 illustrates a flow chart 700 that demonstrates yet another embodiment. In operation 702, a call center receives an input communication originating from a telephone caller and comprising sensitive data, such as personally identifiable information data. A determination is made in operation block 704 as to whether the input communication includes PII data. If the communication does include PII data, then at least a portion of the PII data can be suppressed.

Depending upon the implementation, different methods can be implemented to determine if an input communication includes PII data. For example, a signal can be sent to a PII Data Suppression Server from a web server, such as a customer relationship management server or payment web server, or a call center agent's computer when a payment web page has been served to a computer used by a call center agent. In accordance with another implementation, a signal can be generated from a web server, such as a customer relationship management server or payment web server, or a user's computer that a call center agent has activated a payment interface. Still, in another implementation, a determination can be made that a call center agent is positioning a cursor or other pointing object in a payment portion of a graphical user interface in order to trigger a signal.

In operation 706, at least a portion of the received PII data can be suppressed. This can be implemented without requiring a physical interrupt of the input communication, so that the received PII data is not conveyed to a call center agent or to a computer of a call center agent.

The suppression of at least a portion of the PII data can be implemented in a variety of ways. For example, all of the PII data can be removed and not sent forward to a call center agent. Or, the PII data can be replaced with proxy data, such as proxy tone data, before the proxy tone data is sent on to the call center agent. When VOIP transmissions are implemented, VOIP packets can be intercepted and manipulated, e.g., by removing the PII data from the VOIP packets or by replacing the PII data in the VOIP packets with proxy PII data.

Notably, these methods of suppressing the PII data can be implemented without having to hardware terminate a transmission and then regenerate the communication.

A variety of devices can be utilized to intercept communications. For example, a server located between a telephone caller and a call center telephone switch can be used to intercept VOIP packets containing sensitive data. A call center telephone switch itself can be used to intercept sensitive data, such as DTMF data. Similarly, a router can be utilized to intercept sensitive data.

When a call monitoring operation is being performed, at least a portion of the received PII data can be suppressed without pausing call monitoring of the input communication. This can be implemented for example, by removing PII data from VOIP packets before they are communicated onward to the call monitoring receiver.

Operation 708 shows that a voice connection can be maintained between a caller and a call center agent when PII data is being suppressed. And operation 712 shows that the remainder of the input communication can be conveyed to the call center agent or to the computer of the call center agent.

As noted herein, some standards require that sensitive data not be stored. Thus, operation 714 illustrates that physical storage of transient PII data can be prevented before handing off the PII data to an adjunct process, such as a payment process. Similarly, operation 716 shows that after the PII data is suppressed, steps can be taken to prevent the PII data from being conveyed to a device that is not within the scope of a standard, such as the PCI-DSS standard.

Figure 8:
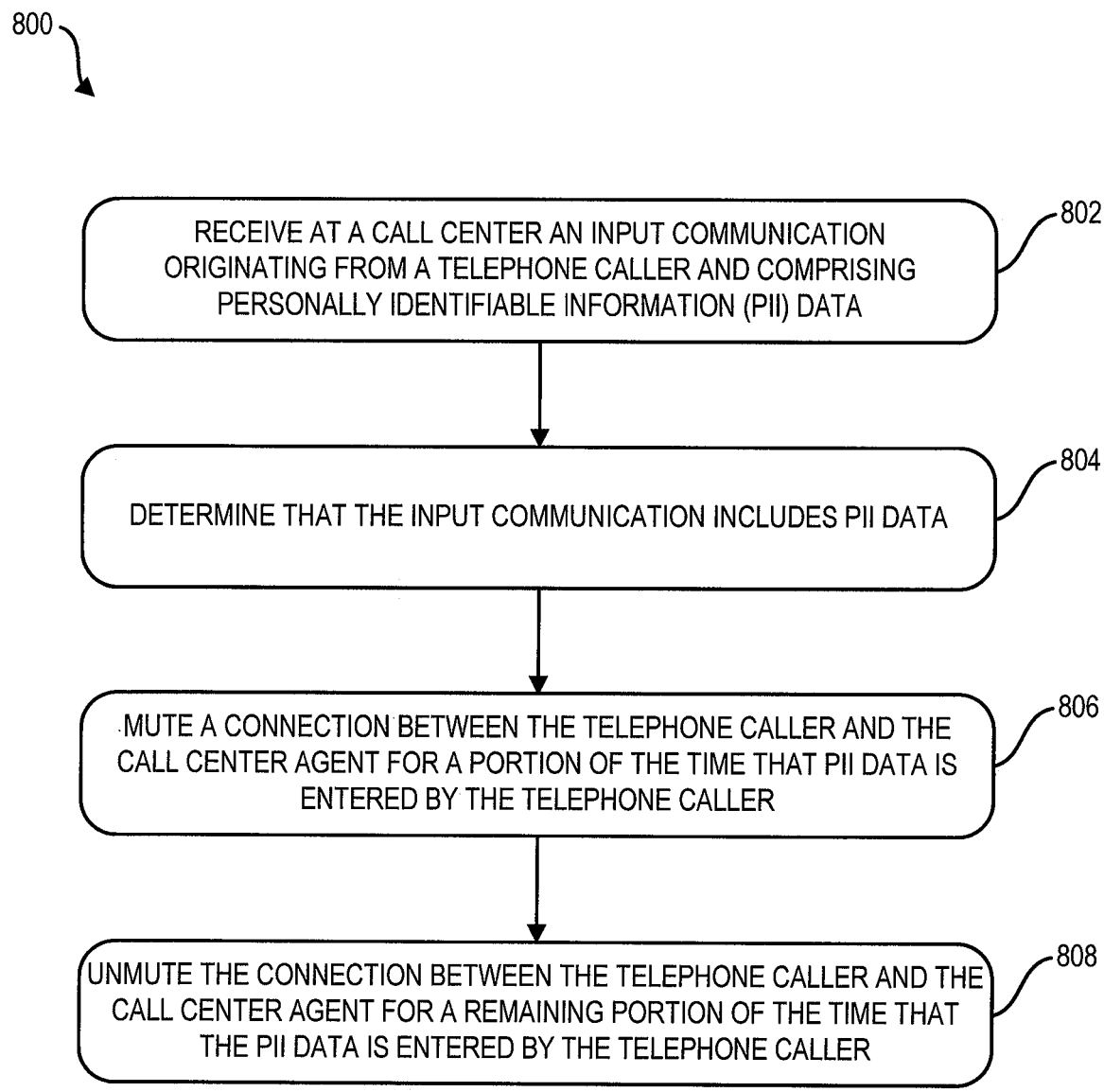
FIG. 8 illustrates a flow chart that demonstrates a method of muting and unmuting a connection between a telephone caller and a call center agent in accordance with one embodiment.

FIG. 8 illustrates another embodiment via flow chart 800. In operation 802, an input communication is received at a call center from a telephone caller. The communication includes sensitive data, such as personally identifiable information data. In operation 804, a determination is made that the input communication contains PII data.

If the input communication contains PII data, then a connection between the telephone caller and the call center agent can be muted during at least a portion of the time that the telephone caller enters PII data. For example, the audio can be muted for the middle seven numbers (or other amount of numbers) of a credit card number when a user enters the credit card information. This is illustrated by operation 806. Similarly, the connection between the telephone caller and the call center agent can be unmuted for the remaining portion(s) of the time that the PII data is entered by the telephone caller, as shown in operation 808.

Figure 9:
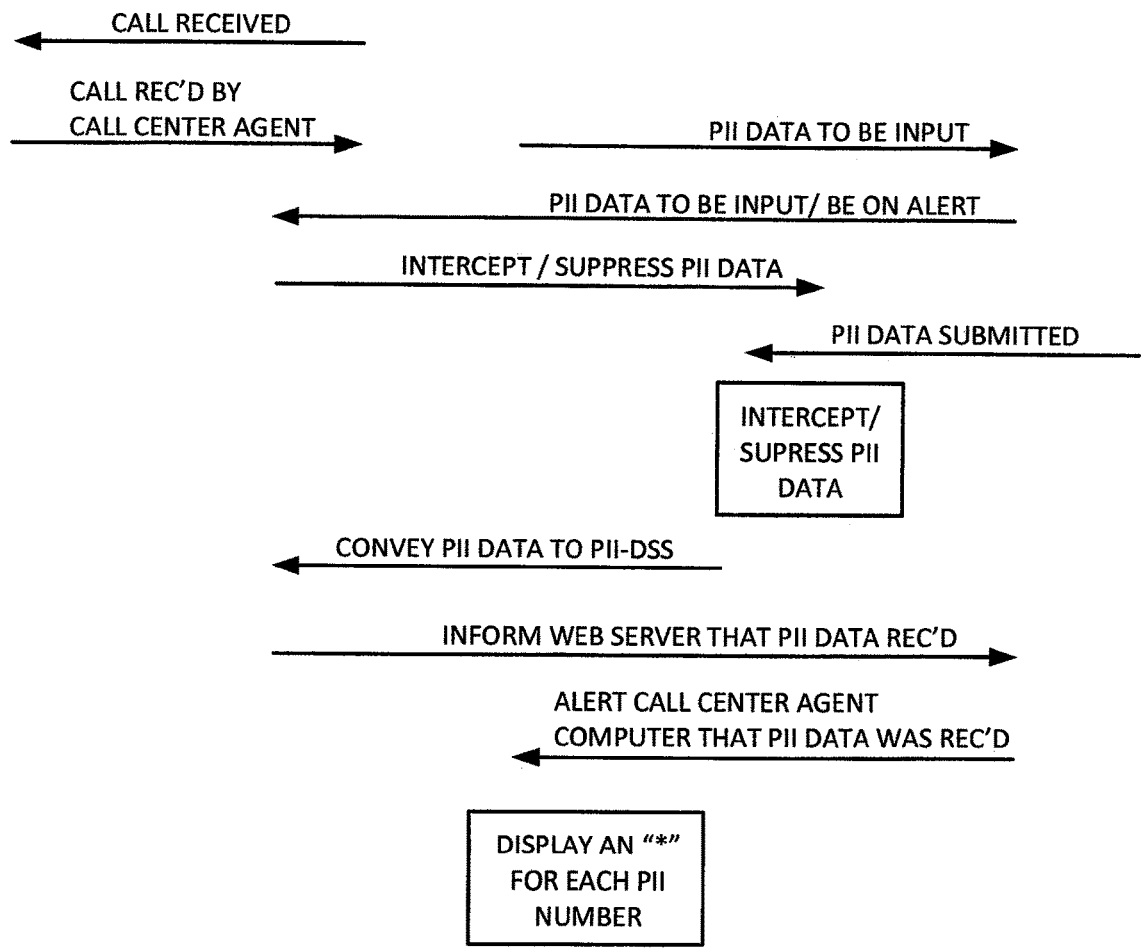
FIG. 9 illustrates a sequence diagram in accordance with one embodiment.

FIG. 9 illustrates a sequence diagram for suppressing data in accordance with the processes described herein. As can be seen in FIG. 9, a computer telephony integration (CTI) server detects that a call center agent computer has received a call. The CTI server notifies the PII Data Suppression Server that the telephone associated with the call center agent is handling a call. When the call center agent's computer loads a payment web page or graphical user interface for payment information, the web server is alerted to the fact that sensitive data, such as PII data is about to be entered. The web server alerts the PII Data Suppression Server.

Upon being notified that PII data is ready to be entered by the caller, the PII Data Suppression Server instructs a communication device (e.g., a VOIP session border controller, a call center telephone switch, or a router) to intercept and suppress any numeric data being sent by a caller to the call center agent. The communication device identifies the submitted PII data and strips it from the caller's incoming communication. Moreover, the communication device sends the PII data to the PII Data Suppression Server without sending the PII data onto the call center agent's phone/computer. Any non-PII data, such as voice data, is not stripped from the communication and is allowed to pass to the call center agent's phone/computer.

The PII Data Suppression Server accumulates and holds the PII data in one or more registers of its computer processor. The PII Data Suppression Server also informs the web server that the PII data has been received. The web server in turn alerts the computer of the call center agent that the PII data has been received. The computer of the call center agent can display a placeholder, such as an asterisk, for each number in the PII data so that the call center agent can follow the entry of data on his or her computer.

In accordance with other embodiments, incoming non-voice data can be processed differently from incoming voice data. This permits the incoming non-voice data to be modified if sensitive data, such as PII data, is present in the non-voice data. It also allows, in some instances, the incoming voice data to be sent directly to a voice processing device (VPD) while the non-voice data is processed differently.

A voice processing device is a device that processes voice data. For example, a voice processing device could be a private branch exchange (PBX), an interactive voice response (IVR) system, an automatic call distribution (ACD) system, a predictive dialer, or a robo-caller. A private branch exchange is a telephone system within an enterprise that switches calls between enterprise users on local lines while allowing all users to share a certain number of external phone lines. An interactive voice response system allows customers to interact with a company's host system via a telephone keypad or by speech recognition, after which services can be inquired about through the IVR dialogue. IVR systems can respond with pre-recorded or dynamically generated audio to further direct customers on how to proceed. An automatic call distribution system is a telephony device that answers and distributes incoming calls to a specific group of terminals or agents within an organization. ACDs often use a voice menu to direct callers based on the customer's selection, telephone number, selected incoming line to the system, or time of day the call is processed.

Figure 10:
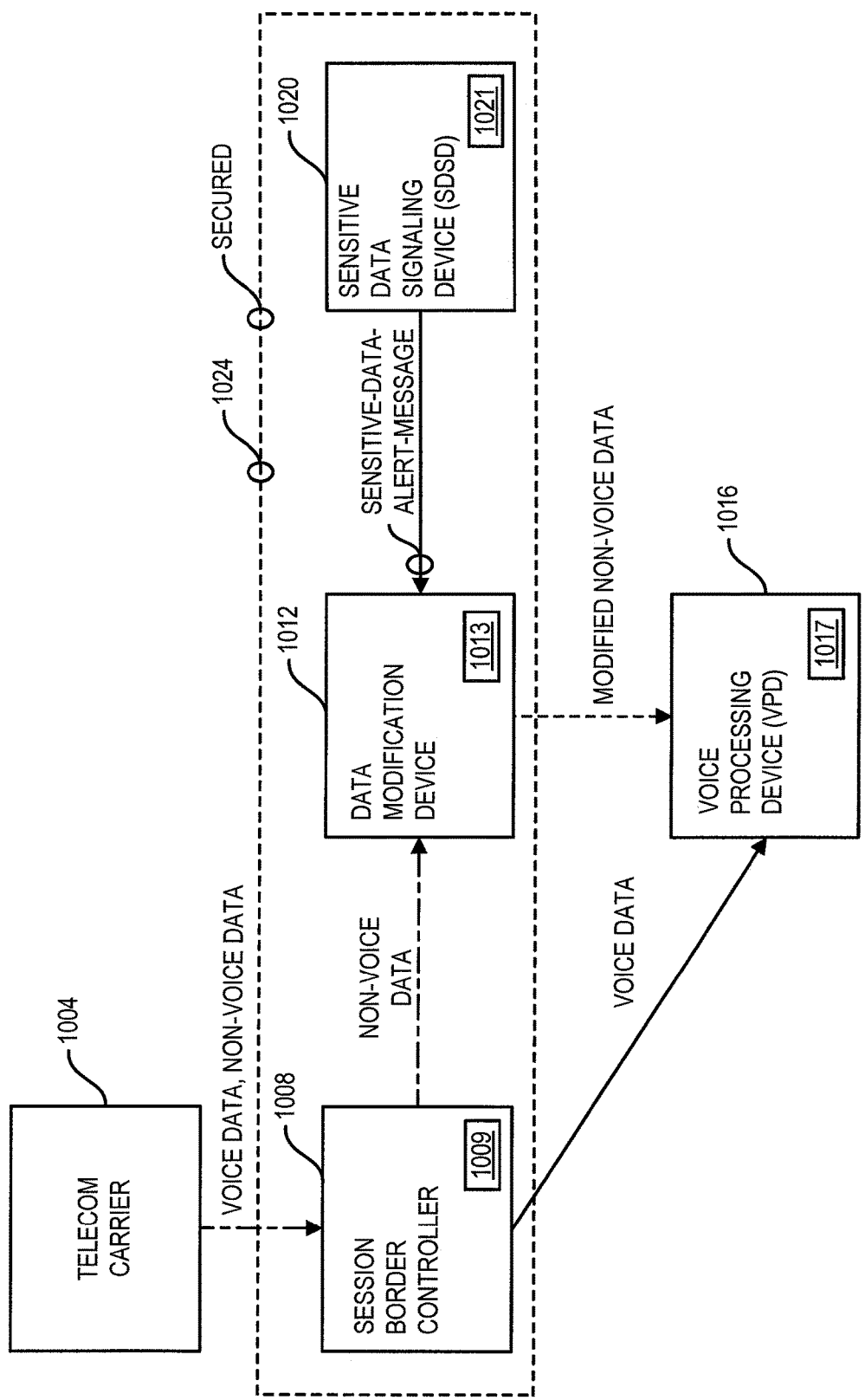
FIG. 10 illustrates an embodiment of a system in which a Telecom Carrier or other voice communication supplier sends voice data and non-voice data to a VOIP session border controller.

FIG. 10 illustrates an embodiment of a system in which a Telecom Carrier 1004 or other voice communication supplier sends voice data and non-voice data to a VOIP session border controller 1008. The VOIP session border controller can include a first computer processor 1009 that is programmed to receive the voice data and non-voice data. The first computer processor can also be programmed to send the non-voice data to a Data Modification Device 1012 and to send the voice data to a voice processing device 1016.

One way in which the voice data and non-voice data can be sent to different devices is by assigning different internet protocol addresses to the destination of the different data streams. For example, the voice data can be routed to a first destination that is assigned a first IP address and the non-voice data can be routed to a destination that is assigned a second IP address. In FIG. 10, for example, the voice processing device can be associated with a first IP address and the Data Modification Device can be associated with a second IP address. The session border controller can then route the different data streams accordingly. Moreover, the session border controller, for example, can be the device that receives an incoming stream of voice data and non-voice data and assigns the voice data to go to a first IP address and assigns the non-voice data to go to a second IP address.

The Data Modification Device 1012 can include a second computer processor 1013 that is programmed to check the incoming non-voice data. If the incoming non-voice data includes any sensitive data, such as PII data, then the Data Modification Device 1012 can modify at least a portion of the received non-voice data. The Data Modification Device 1012 may also be programmed to send the modified non-voice data to a third processor 1017 of a voice processing device 1016.

The second computer processor 1013 of the Data Modification Device 1012 can also be programmed to process received sensitive-data-alert-messages. In FIG. 10, a sensitive data signaling device 1020 is shown with a fourth processor 1021 for signaling the Data Modification Device 1012. When the sensitive data signaling device sends a sensitive-data-alert-message, the Data Modification Device 1012 responds by checking for sensitive data in the incoming non-voice data that the Data Modification Device 1012 receives. The sensitive data signaling device may also send a stand down message to the Data Modification Device in order to inform the Data Modification Device that it may cease checking for sensitive data. Alternatively, if the Data Modification Device receives a message as part of the received sensitive data and that received message indicates the end of the string of incoming sensitive data, then the Data Modification Device can cease checking for sensitive data. Such a message could be embedded as part of the string of sensitive data before the string of sensitive data is sent from the Telecom Carrier. When the Data Modification Device is not in the mode of checking the incoming non-voice data for sensitive data, then the Data Modification Device can simply pass the received non-voice data onward, for example to the voice processing device. Essentially, the Data Modification Device is in a pass-through mode when not checking for sensitive data.

As is apparent from the description herein, a Data Modification Device is a telecom device that at a minimum can receive an incoming non-voice data signal; check the received non-voice data for sensitive data; and modify the received non-voice data so as to protect the sensitive data. Modification can include: removal of at least a portion of the sensitive data from the received non-voice data; disguising of at least a portion of the sensitive data in the non-voice data; or replacement of at least a portion of the sensitive data in the non-voice data with nonce data.

Moreover, as is apparent from the description herein, a sensitive-data-alert-message is a signal that alerts a telecom device to look for sensitive data in a sequence of telecom data. In some embodiments, a sensitive-data-alert-message is referred to herein as a triggering signal. A sensitive data alert message could be as complex as a formatted message or as simple as a binary input, depending on the embodiment.

As is also apparent from the description herein, a sensitive data signaling device is a device that generates a sensitive-data-alert-message. One example of a sensitive data signaling device is the PII Data Suppression Server described above.

FIG. 10 also shows that several of the devices can be maintained within a secured area. An example of a secured area is illustrated by dashed line 1024. Devices located within dashed line 1024 can be made compliant with a sensitive data security standard, such as PII-DSS. In FIG. 10, the VOIP session border controller 1008, the Data Modification Device 1012, and the sensitive data signaling device 1020 are shown within the dashed line 1024. This arrangement helps to secure any sensitive data received from the Telecom Carrier 1004. Any such received sensitive data can be removed, modified, protected, and/or disguised before it is sent outside of the secured area. Moreover, devices that are outside of the secure area do not need to comply with the security standard, as such devices do not receive the sensitive data. Thus, cost can be reduced by not having to secure such devices unnecessarily.

Figure 11:
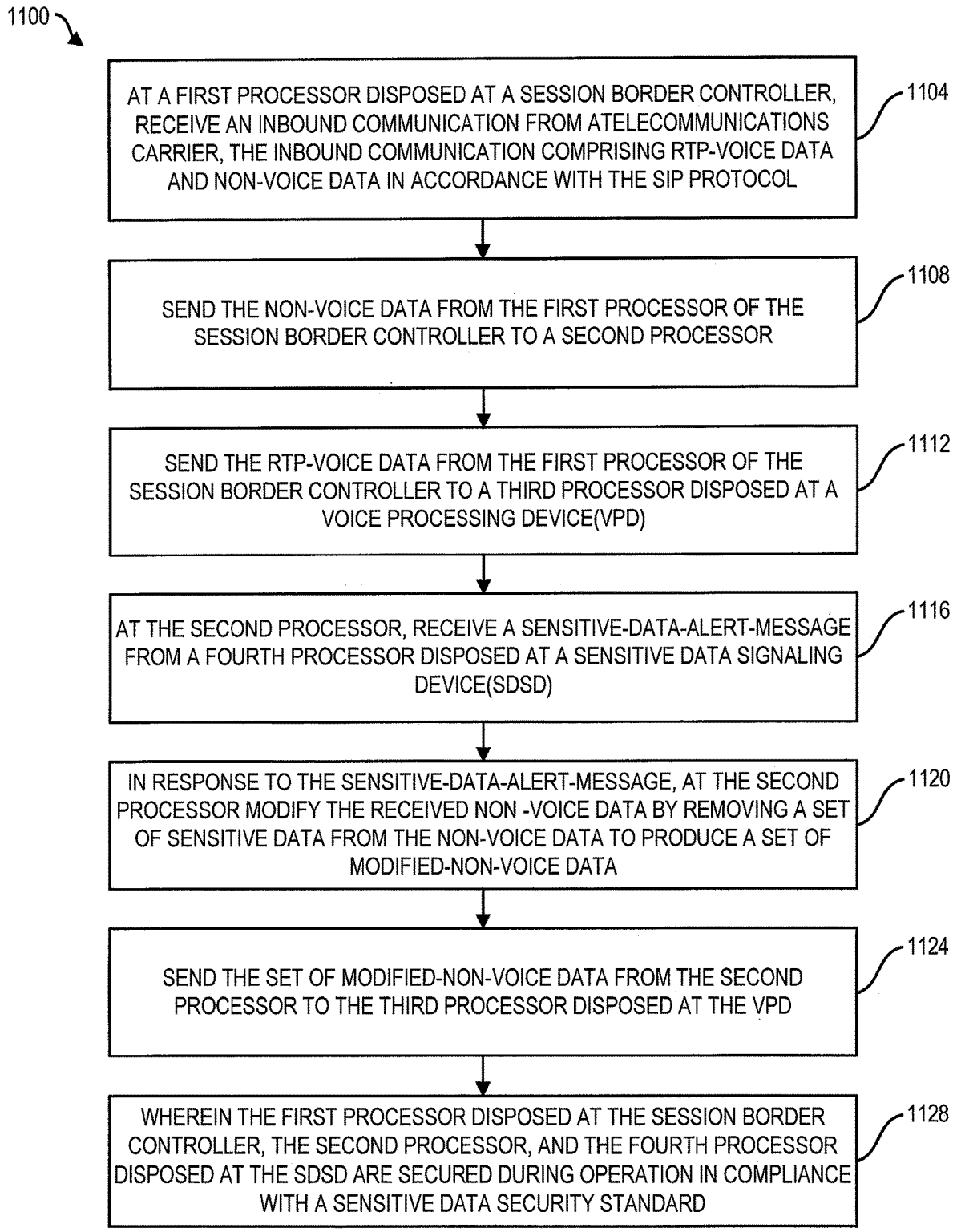
FIG. 11 is a flow chart that illustrates an embodiment of a method of modifying sensitive data.

FIG. 11 is a flow chart 1100 that illustrates an embodiment of a method of modifying sensitive data. In operation block 1104, a first processor disposed at a VOIP session border controller can receive an inbound communication from a telecommunications carrier. The inbound communication can comprise voice data, such as RTP voice data, and non-voice data, such as non-voice data in accordance with an SIP protocol. Examples of an SIP protocol are the SIP-INFO protocol, the SIP-NOTIFY protocol as well as the SIP-NOTIFY/KPML protocol.

In operation block 1108, the non-voice data can be sent from the first processor of the VOIP session border controller to a second processor. Similarly, in block 1112, the voice data, such as RTP-voice data, can be sent from the first processor of the VOIP session border controller to a third processor disposed at a voice processing device (VPD).

In operation block 1116, a second processor can receive a sensitive-data-alert-message from a fourth processor disposed at a sensitive data signaling device (SDSD). Operation block 1120 shows that in response to the sensitive-dataalert-message, that the second processor can modify the received non-voice data—e.g., by removing a set of sensitive data from the non-voice data—to produce a set of modified-non-voice data.

In operation block 1124, the set of modified-non-voice data can be sent from the second processor to the third processor disposed at the voice processing device.

Block 1128 illustrates that the first processor disposed at the VOIP session border controller, the second processor, and the fourth processor disposed at the sensitive data signaling device can all be secured during operation in compliance with a sensitive data security standard, such as PII-DSS.

Figure 12:
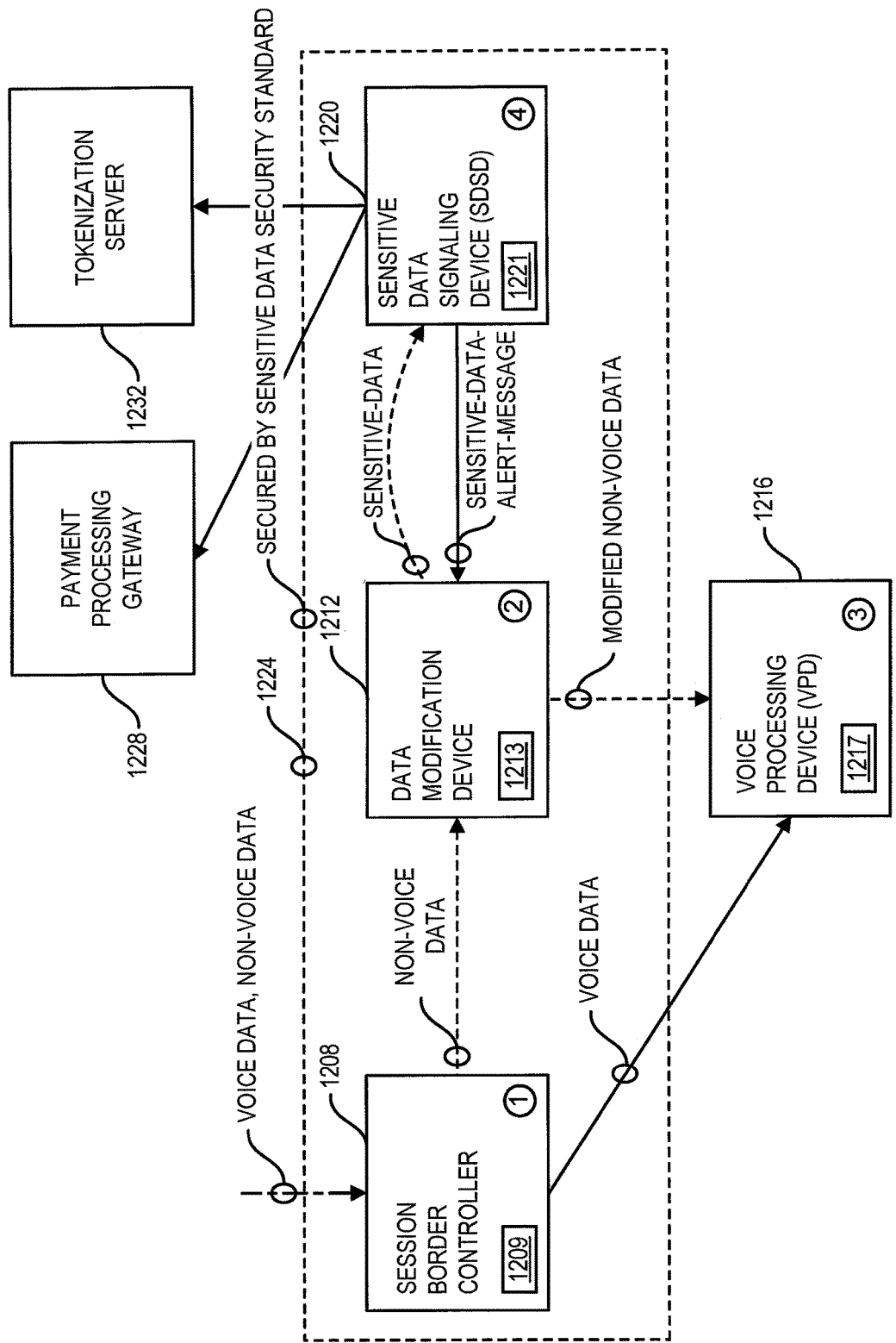
FIG. 12 illustrates another embodiment of a data modification system.

FIG. 12 illustrates another embodiment. As shown in FIG. 12, a first processor 1209—disposed at a VOIP session border controller 1208, for example—can receive an incoming communication. The incoming communication can include a voice data component as well as a non-voice data component. For example, the incoming communication can include non-voice data conforming to an SIP protocol. Examples of an SIP protocol are the SIP-INFO protocol, the SIP-NOTIFY protocol as well as the SIP-NOTIFY/KPML protocol. A second processor 1213—disposed at a Data Modification Device, for example—can be communicatively coupled with the first processor. A third processor 1217—disposed at a voice processing device 1216, for example—can be communicatively coupled with both the first processor 1209 and the second processor 1213. A fourth processor 1221—disposed at a sensitive data signaling device 1220, for example—can also be communicatively coupled with the second processor 1213. The fourth processor can also be communicatively coupled with a Payment Processing Gateway 1228 and a Tokenization Server 1232.

In accordance with one embodiment, the first processor 1209 of the VOIP session border controller 1208 receives an incoming communication that includes a voice data component and a non-voice data component. The VOIP session border controller sends the voice data to the third processor 1217 of the voice processing device 1216. The VOIP session border controller sends the non-voice data to the second processor 1213 of the Data Modification Device 1212.

The fourth processor 1221 located at the sensitive data signaling device 1220 generates a sensitive-data-alert-message. The sensitive-data-alert-message is sent to the second processor of the Data Modification Device 1213 when delivery of sensitive data is anticipated. As explained herein, sensitive data can be anticipated under a variety of triggering conditions.

When the second processor 1213 of the Data Modification Device 1212 receives a sensitive-data-alert-message from the fourth processor of the sensitive data signaling device 1220, the second processor begins checking any incoming non-voice data for sensitive data. If any sensitive data is detected, the second processor 1213 of the Data Modification Device 1212 can modify at least a portion of the sensitive data. The resulting modified-non-voice-data is sent from the second processor of the Data Modification Device to the third processor 1217 of the voice processing device 1217.

Moreover, the second processor 1213 of the Data Modification Device 1212 can send the detected sensitive data to the fourth processor of the sensitive data signaling device. As one example, the sensitive data signaling device can be an automatic call distributor (ACD). The sensitive data can be encrypted by the second processor 1213 before being sent to the fourth processor, as well.

The fourth processor of the sensitive data signaling device can temporarily hold the sensitive data, preferably in one or more registers of the fourth processor. The sensitive data may then be used. For example, the sensitive data may be sent to a Payment Processing Gateway 1228 and a Tokenization Server 1232 by the fourth processor of the sensitive data signaling device 1220.

FIG. 12 shows the VOIP session border controller 1208, the Data Modification Device 1213, and the sensitive data signaling device 1220 enclosed by a dashed line. The dashed line represents a sensitive data security standard 1224. This arrangement helps to secure any sensitive data. Any devices of a call center that are outside of the secure area do not need to comply with the security standard, as such devices do not receive the sensitive data. Thus, cost can be reduced by not having to secure such devices unnecessarily.

Figure 13:
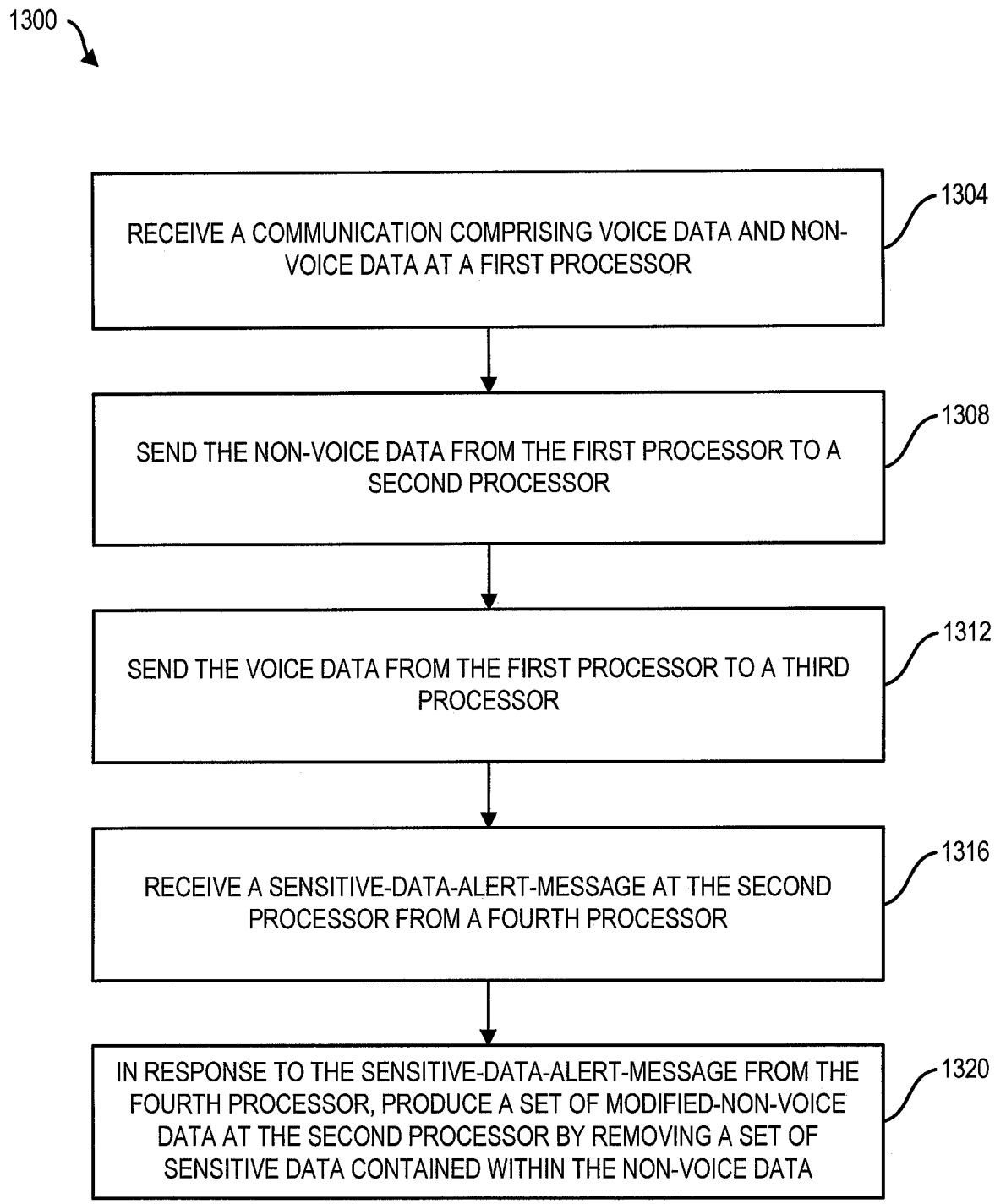
FIG. 13 is a flow chart that illustrates an embodiment of a method of modifying sensitive data.

FIG. 13 is a flow chart 1300 that illustrates an embodiment of a method of modifying sensitive data. In operation block 1304, a communication comprising voice data and non-voice data is received at a first processor. In operation block 1308, the non-voice data is sent from the first processor to a second processor. In operation block 1312, the voice data is sent from the first processor to a third processor.

In operation block 1316, a sensitive-data-alert-message sent by a fourth processor is received at the second processor. In response to the sensitive-data-alert-message, a set of modified-non-voice data is produced by the second processor, as shown by operation block 1320. The set of modified-non-voice data is produced by removing a set of sensitive data contained within the non-voice data.

Figure 14:
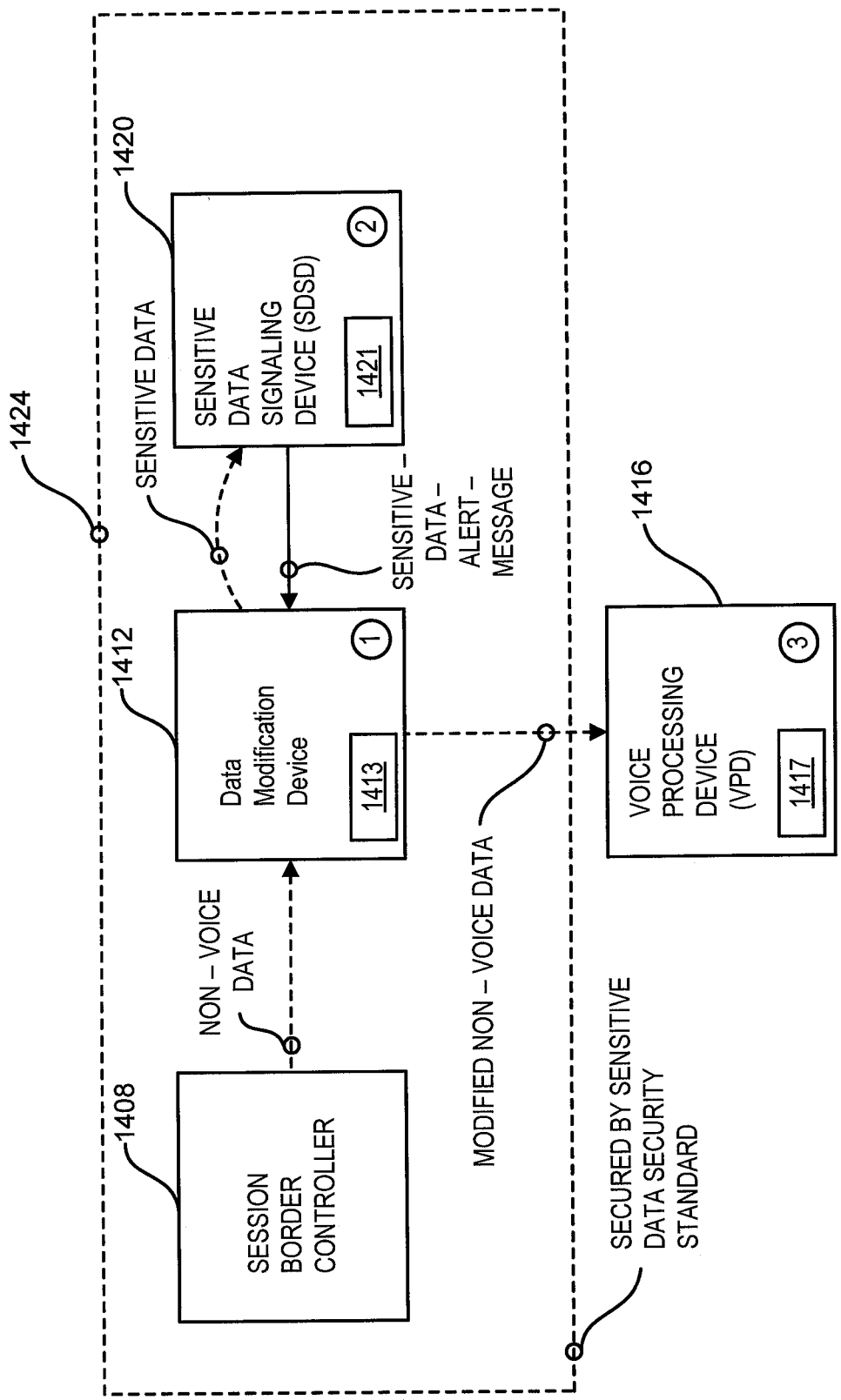
FIG. 14 illustrates an embodiment of a data modification system.

FIG. 14 helps to illustrate an embodiment that focuses on a Data Modification Device 1412. A Data Modification Device 1412 can be a stand-alone device that includes a first processor 1413. The Data Modification Device 1412 can be positioned within a system that includes a VOIP session border controller 1408, a voice processing device 1416, and a sensitive data signaling device 1420.

The first processor 1413 of the Data Modification Device 1412 is shown in FIG. 14 receiving non-voice data from the VOIP session border controller 1408. For example, the non-voice data can be formatted in accordance with an SIP protocol. Examples of an SIP protocol are the SIP-INFO protocol, the SIP-NOTIFY protocol as well as the SIP-NOTIFY/KPML protocol. The first processor 1413 of the Data Modification Device 1412 is also shown receiving a sensitive-data-alert-message from the sensitive data signaling device 1420. Such a signal can be generated by the second processor 1421 of the sensitive data signaling device 1420.

Upon receiving the sensitive-data-alert-message, the first processor 1413 of the Data Modification Device 1412 can respond to the sensitive-data-alert-message by checking for sensitive data included in the non-voice data. When sensitive data is detected in the non-voice data, the second processor 1413 of the Data Modification Device can remove a set of the sensitive data contained within the non-voice data. The received non-voice data is thus modified by the first processor 1413 of the Data Modification Device 1412. The modified non-voice data is sent by the first processor to the third processor 1417 of the voice processing device 1416.

Moreover, the first processor 1413 of the Data Modification Device 1412 can send the set of sensitive data to the second processor 1421 of the sensitive data signaling device 1420. The first processor can in some embodiments encrypt the set of sensitive data before sending it to the second processor 1421.

The VOIP session border controller, Data Modification Device, and sensitive data signaling device can all be secured in accordance with a sensitive data security standard. The dashed line 1424 in FIG. 14 represents a sensitive data security standard. In this embodiment, the voice processing device does not need to be secured in accordance with the sensitive data security standard.

Figure 15:
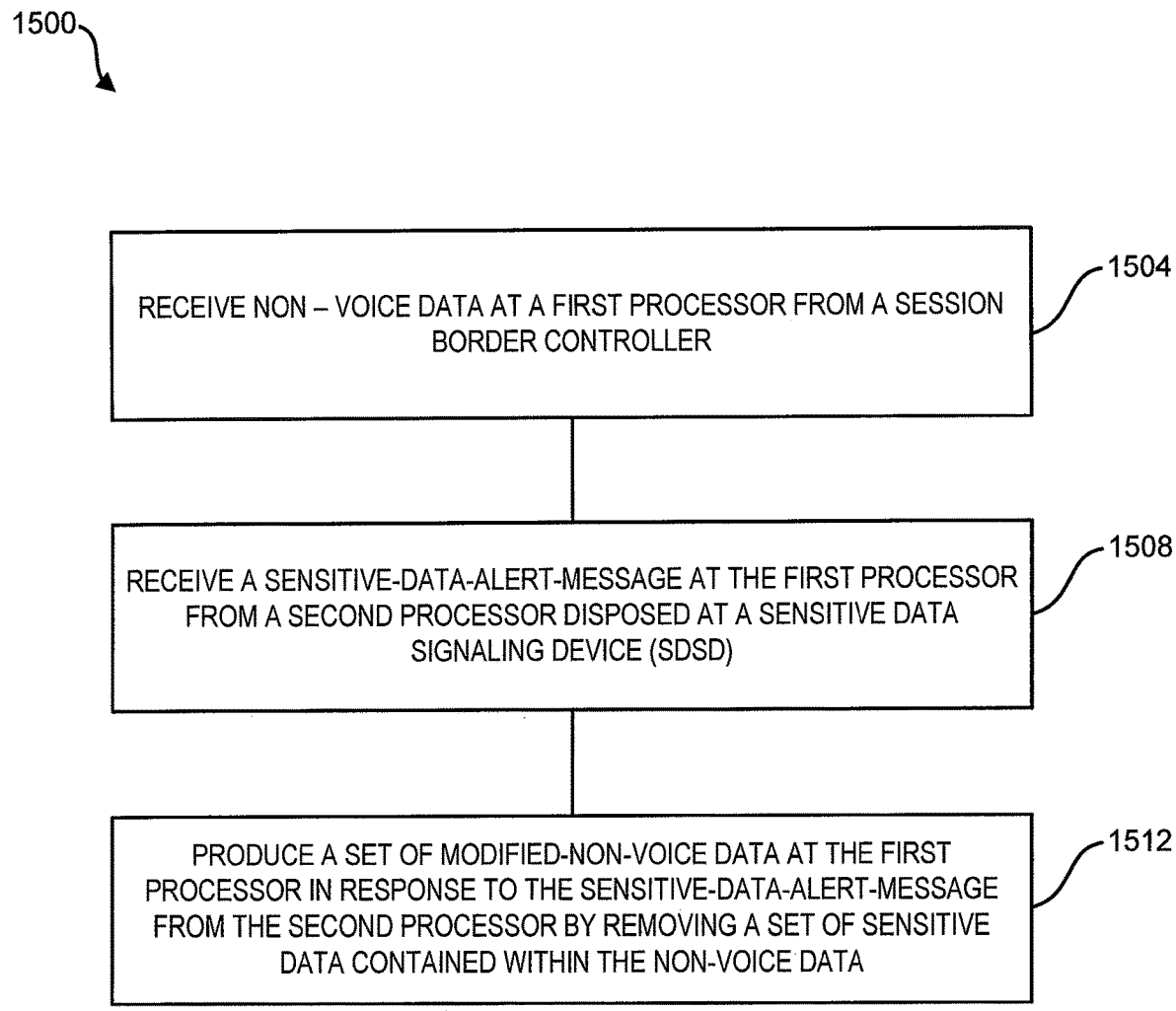
FIG. 15 is a flow chart that illustrates an embodiment of a method of modifying sensitive data.

FIG. 15 is a flow chart 1500 that illustrates an embodiment of a method of modifying sensitive data. In operation block 1504, a first processor receives non-voice data from a session border controller. In operation block 1508, the first processor receives a sensitive-data-alert-message from a second processor disposed at a sensitive data signaling device. And, in operation block 1512, the first processor produces a set of modified-non-voice data in response to the sensitive-data-alert-message from the second processor. The first processor produces the modified-non-voice data by removing a set of sensitive data contained within the non-voice data.

The set of modified non-voice data can be sent from the first processor to the third processor disposed at a voice processing device. The sensitive data removed from the non-voice data can be sent to the second processor disposed at the sensitive data signaling device. The sensitive data can be encrypted before being sent to the sensitive data signaling device.

The non-voice data can be a communication conforming to an SIP protocol. Examples of an SIP protocol are the SIP-INFO protocol, the SIP-NOTIFY protocol as well as the SIP-NOTIFY/KPML protocol. The first processor can be secured in accordance with a sensitive data security standard.

Figure 16:
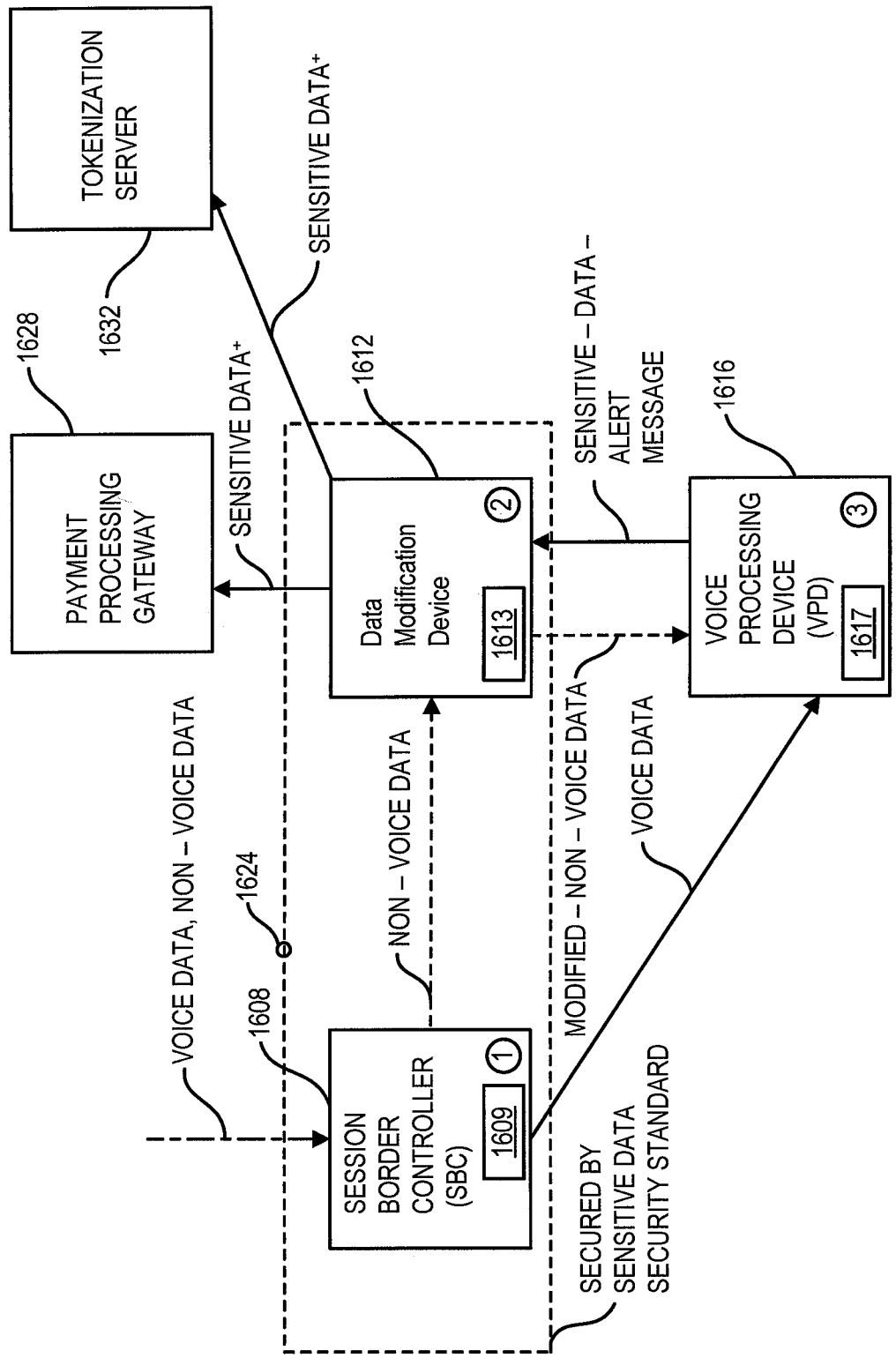
FIG. 16 illustrates a data modification system in which the sensitive-data-alert-message comes from a voice processing device, such as an Interactive Voice Response (IVR) system.

FIG. 16 illustrates a data modification system in which the sensitive-data-alert-message comes from a voice processing device, such as an Interactive Voice Response (IVR) system. In FIG. 16, a first processor 1609 disposed at a VOIP session border controller 1608 receives a communication that comprises a voice data component and a non-voice data component. The first processor 1609 can send the non-voice data to a second processor 1613 disposed at a Data Modification Device 1612. And the first processor can send the voice data to a third processor 1617 disposed at a voice processing device 1616.

When the third processor at the voice processing device determines that sensitive data is about to be sent to the VOIP session border controller, the third processor can send a sensitive-data-alert-message to the second processor 1613 disposed at the Data Modification Device 1612. For example, if the voice processing device is an Interactive Voice Response (IVR) system, such an IVR system could determine that sensitive data is about to be input by a user. The IVR system could then send the sensitive-data-alert-message to the second processor 1613 of the Data Modification Device 1612.

When the second processor 1613 receives a sensitive-data-alert-message from the third processor 1617, the second processor can check incoming non-voice data for sensitive data. When sensitive data is detected, the second processor can modify the sensitive data and produce modified-non-voice data. In FIG. 16, the modified-non-voice data is sent from the second processor to the third processor 1617 disposed at the voice processing device 1616.

The second processor 1613 of the Data Modification Device 1612 can send the sensitive data that it collects to another entity, such as a Payment Processing Gateway 1628 or a Tokenization Server 1632. Moreover, the sensitive data can be combined with non-sensitive data before being sent to another entity. For example, if payment is being processed, the amount of the purchase, which is non-sensitive data, can be sent along with the credit card number being processed, which is sensitive data.

FIG. 16 shows a dashed line surrounding the VOIP session border controller 1608 and the Data Modification Device 1613. The dashed line represents that the enclosed devices are secured in accordance with a sensitive data security standard. By securing the devices and the communications between the devices in accordance with the security standard, one can ensure that the sensitive data is protected. Moreover, one does not need to secure other devices, such as the voice processing device, with the same sensitive data security standard, because the voice processing device does not receive sensitive data.

Figure 17:
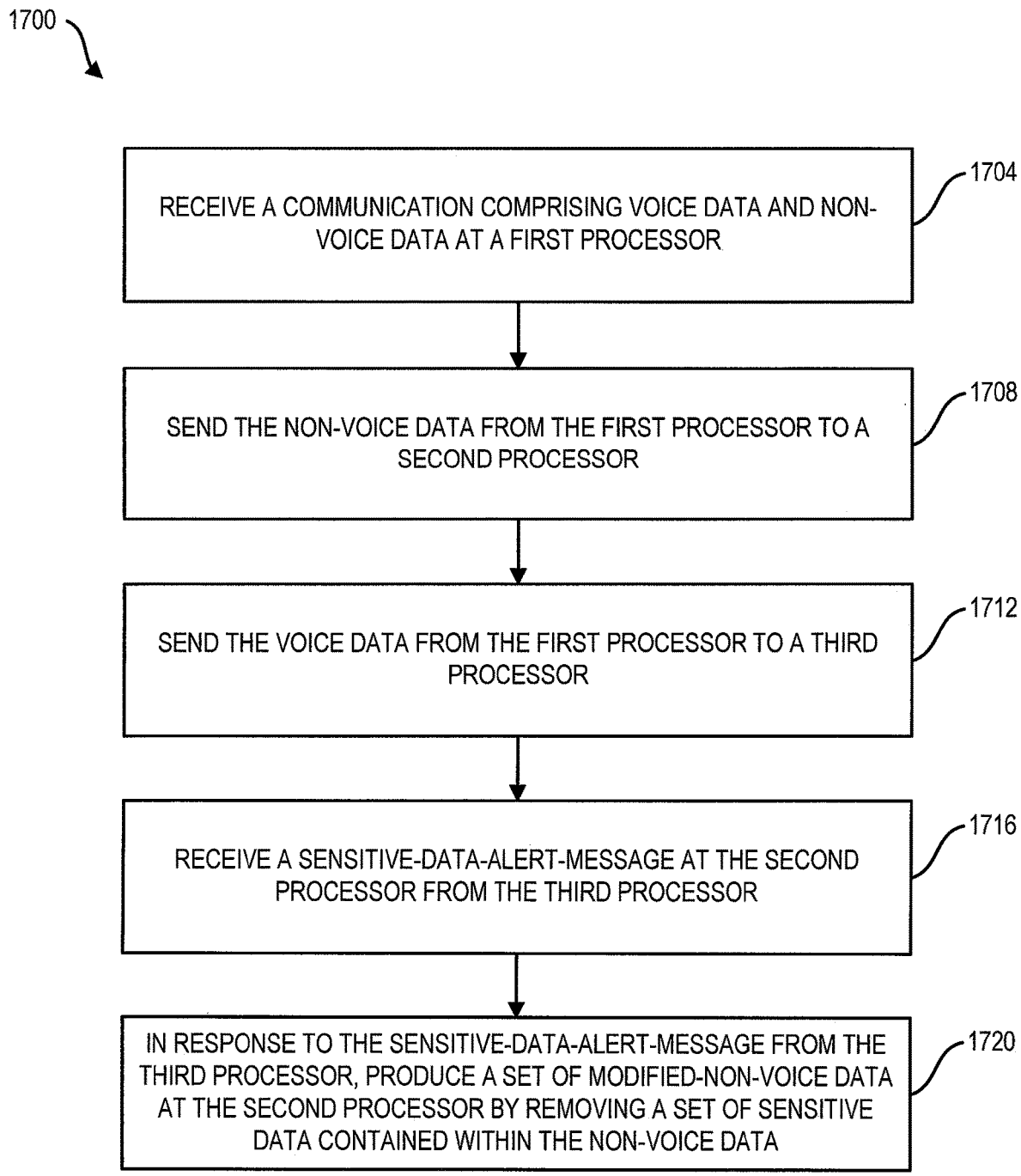
FIG. 17 is a flow chart that illustrates an embodiment of a method of modifying sensitive data.

FIG. 17 is a flow chart 1700 that illustrates an embodiment of a method of modifying sensitive data. In operation block 1704, a first processor receives a communication comprising voice data and non-voice data. The non-voice data can be, for example, in conformance with an SIP protocol. Examples of an SIP protocol are the SIP-INFO protocol, the SIP-NOTIFY protocol as well as the SIP-NOTIFY/KPML protocol. In operation block 1708, the first processor can send the non-voice data to a second processor. In operation block 1712, the first processor can send the voice data to a third processor.

The second processor can receive a sensitive-data-alert-message sent by the third processor. In response to the sensitive-data-alert-message, the second processor can produce a set of modified-non-voice data. The set of modified-non-voice data can be produced, for example, by removing a set of sensitive data contained within the non-voice data.

Figure 18:
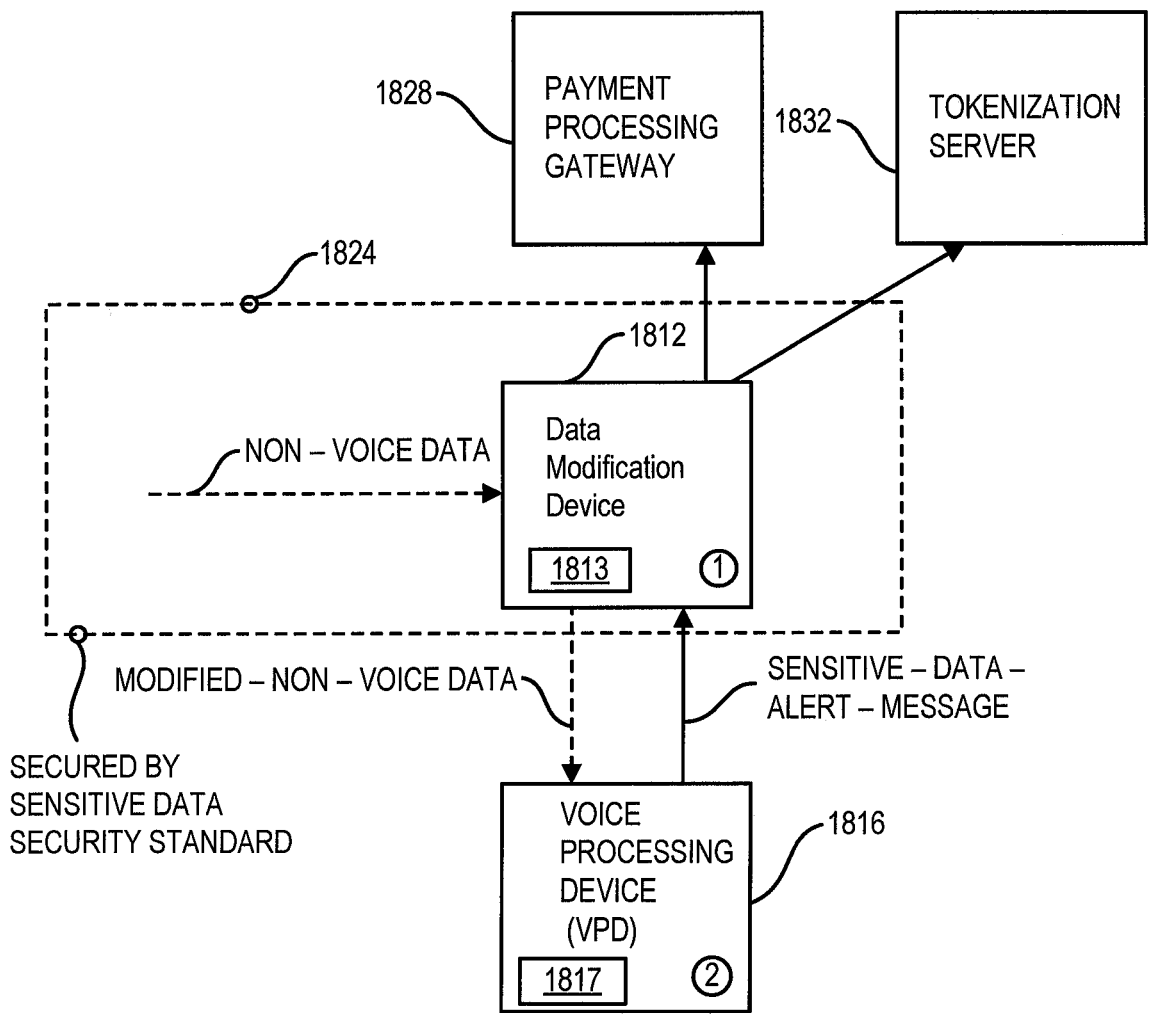
FIG. 18 illustrates an embodiment for modifying non-voice data that is received within a telecommunications system

FIG. 18 illustrates an embodiment of a data modification system. In FIG. 18, a first processor 1813 disposed at a Data Modification Device 1812 receives an incoming communication that comprises non-voice data. The non-voice data could be sent by a telecommunications carrier, a VOIP session border controller, or other source. The non-voice data could be a component of a communication or a separate communication.

A second processor 1817 disposed at a voice processing device 1816 can send a sensitive-data-alert-message to the first processor 1813. The second processor can send the sensitive-data-alert-message when sensitive data is about to be sent to the first processor of the Data Modification Device 1812.

When the first processor 1813 receives the sensitive-data-alert-message from the second processor 1817, the first processor can check incoming non-voice data for sensitive data. If any sensitive data is detected, the sensitive data can be removed by the first processor so as to modify the non-voice data.

The first processor can send the modified non-voice data to the second processor. And the second processor can send the sensitive data to external devices, such as Payment Processing Gateway 1828 and Tokenization Server 1832.

FIG. 18 shows a dashed line 1824 surrounding the Data Modification Device. The dashed line represents a sensitive data security standard. The Data Modification Device is maintained within scope of the sensitive data security standard by complying with the conditions of the standard. In contrast, the voice processing device is shown outside of the dashed line, as the voice processing device does not handle any sensitive data and thus does not need to comply with the security standard.

Figure 19:
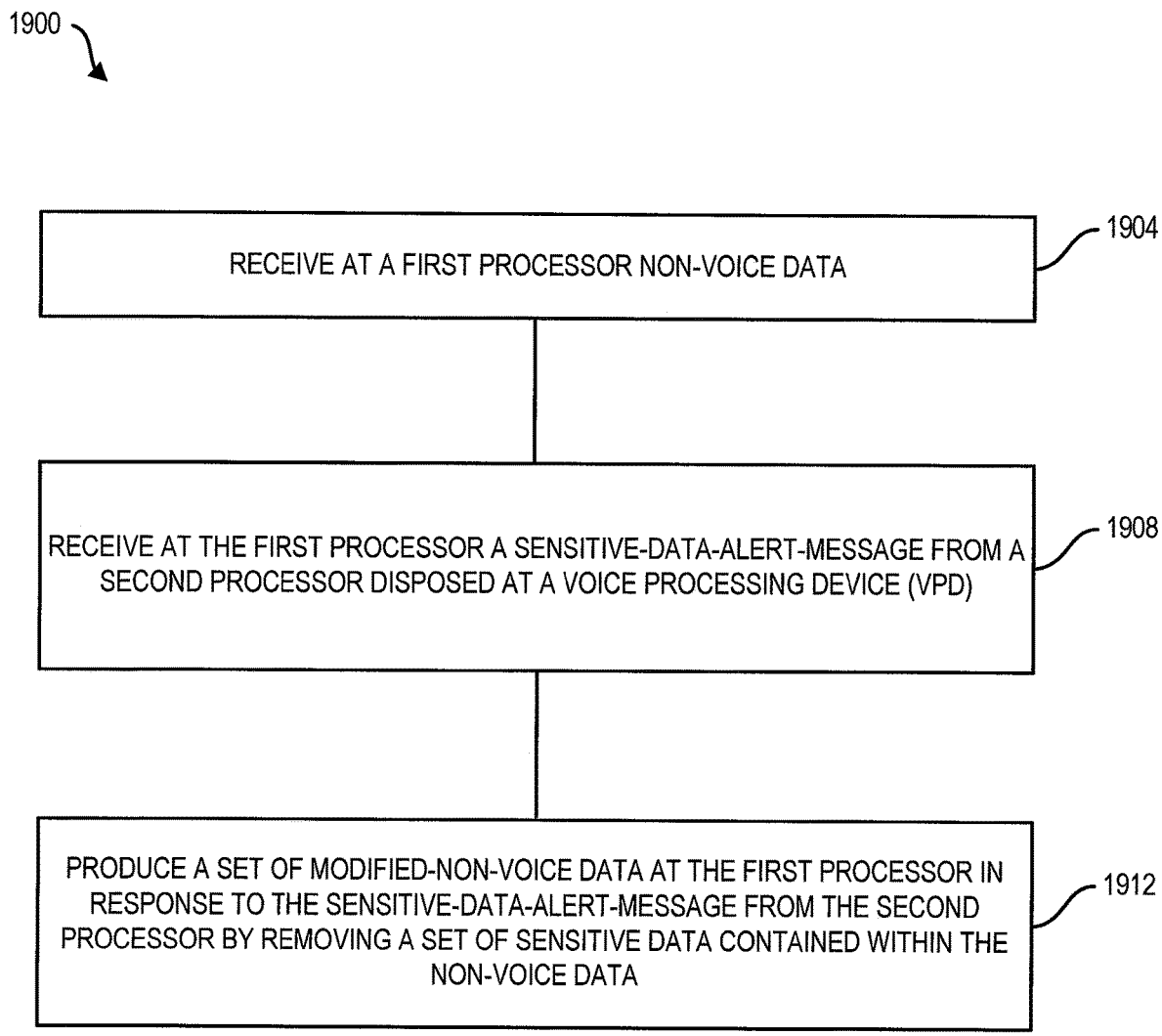
FIG. 19 is a flow chart that illustrates an embodiment of a method of modifying sensitive data.

FIG. 19 is a flow chart 1900 that illustrates an embodiment of a method of modifying sensitive data. In operation block 1904, a first processor receives non-voice data. In operation block 1908, the first processor receives a sensitive-data-alert-message from a second processor disposed at a voice processing device. In operation block 1912, the first processor produces a set of modified non-voice data in response to the sensitive-data-alert-message from the second processor. The set of modified-non-voice data can be produced by removing a set of sensitive data contained within the non-voice data.

Figure 20:
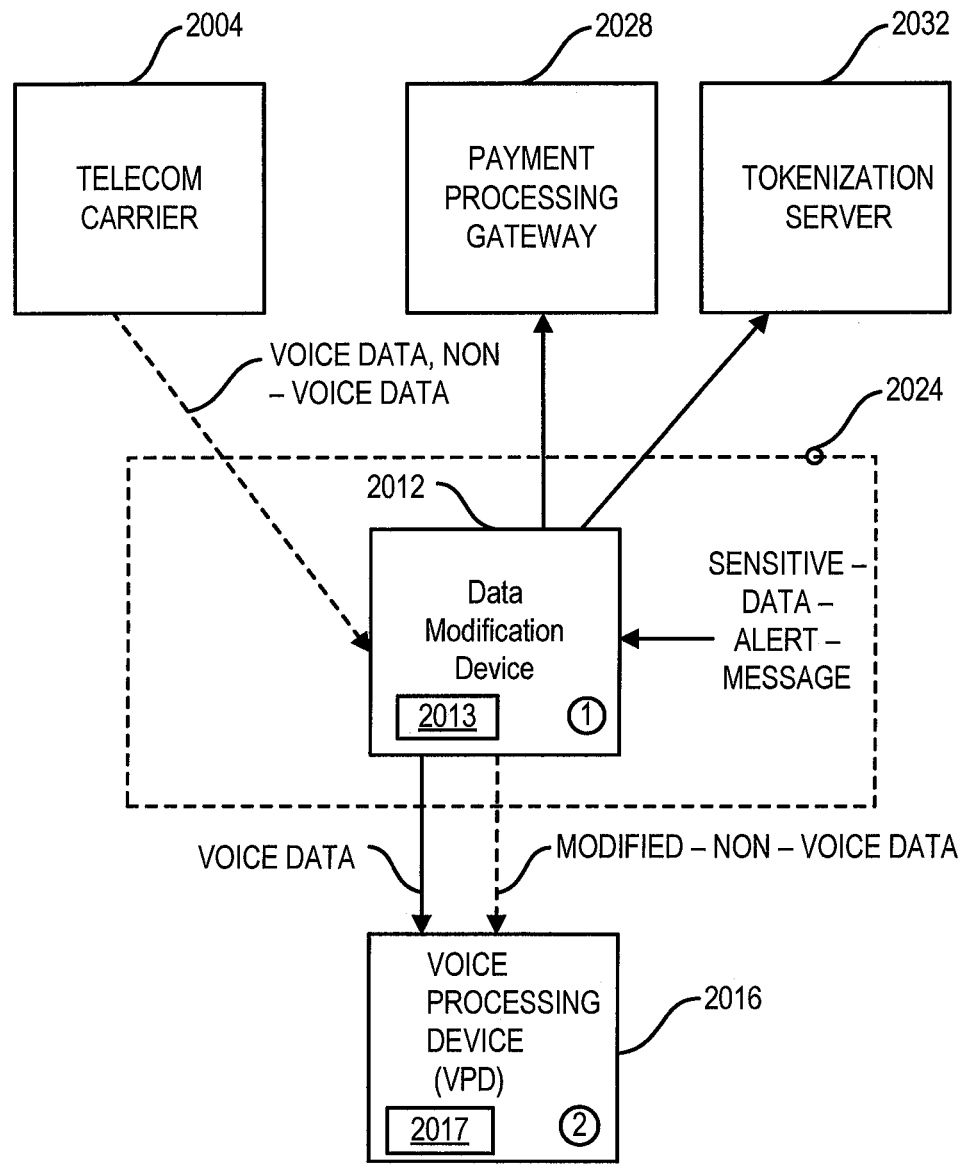
FIG. 20 illustrates an embodiment for modifying non-voice data that is received within a telecommunications system.

FIG. 20 illustrates an embodiment for modifying non-voice data that is received within a telecommunications system. In this particular embodiment, the Data Modification Device can receive voice data and non-voice data as components of an incoming communication directly from the Telecom Carrier 2004. For example, the Data Modification Device could be disposed at a VOIP session border controller or other device that interfaces with the Telecom Carrier 2004.

In FIG. 20, a first processor 2013 disposed at the Data Modification Device 2012 sends the received voice data on to a second processor 2017 disposed at a voice processing device 2016.

If the Data Modification Device receives a sensitive-data-alert-message, the first processor 2013 of the Data Modification Device can check the incoming non-voice data for the presence of any sensitive data. If sensitive data is detected within the non-voice data, the sensitive data can be removed. The modified non-voice data can then be sent to the second processor 2017 disposed at the voice processing device 2016.

The Data Modification Device can also send the intercepted sensitive data to external devices, such as a Payment Processing Gateway 2028 or a Tokenization Server 2032.

The dashed line 2024 surrounding the Data Modification Device represents a sensitive data security standard. The Data Modification Device is maintained within scope of the sensitive data security standard by complying with the conditions of the standard. In contrast, the voice processing device is shown outside of the dashed line, as the voice processing device does not handle any sensitive data and thus does not need to comply with the security standard.

Figure 21:
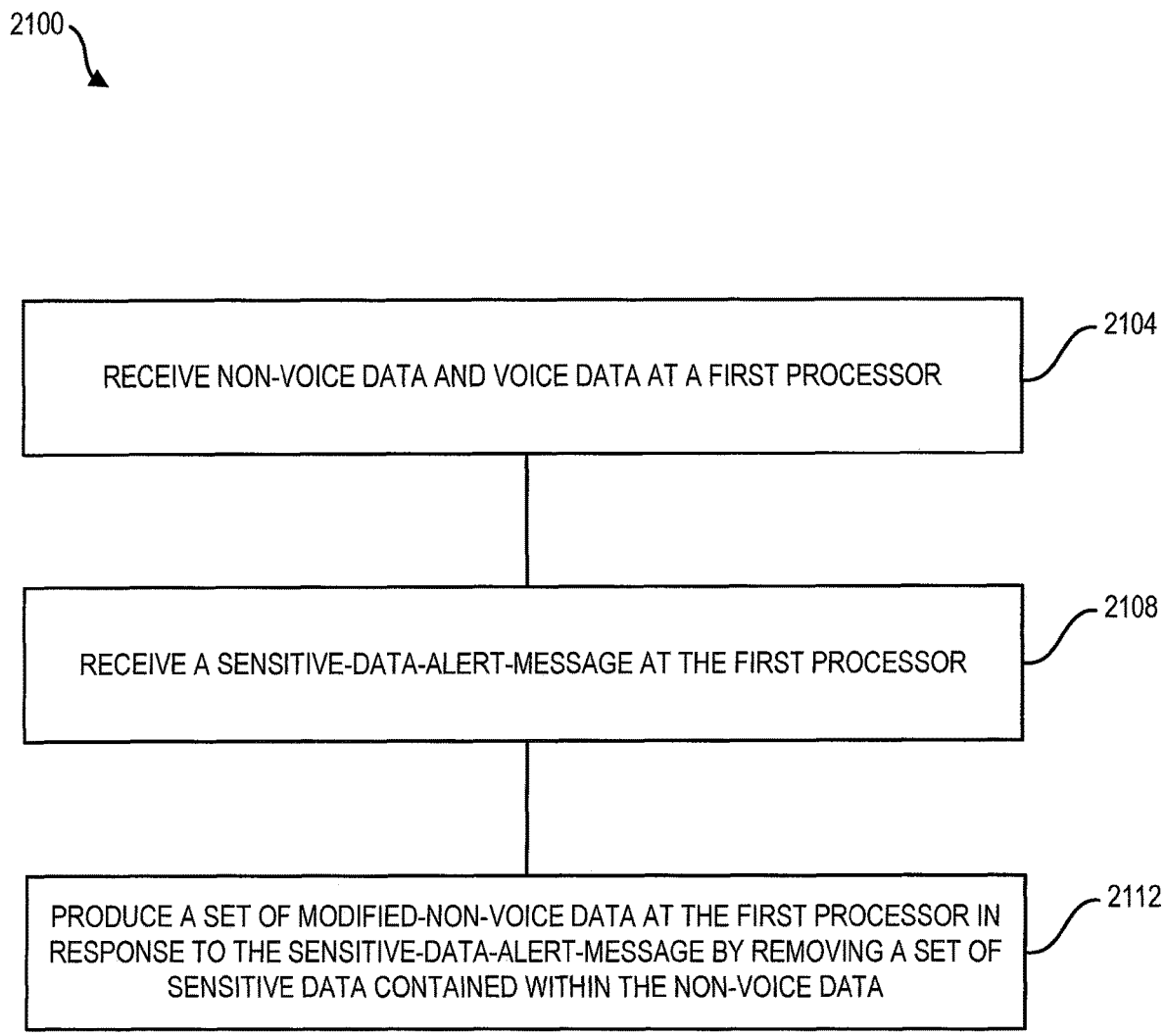
FIG. 21 illustrates a flow chart that illustrates an embodiment of a method of modifying sensitive data.

FIG. 21 is a flow chart 2100 that illustrates an embodiment of a method of modifying sensitive data. In operation block 2104, a first processor receives non-voice data and voice data. In operation block 2108, the first processor receives a sensitive-data-alert-message. And, in operation block 2112, the first processor produces a set of modified-non-voice data in response to the sensitive-data-alert-message by removing a set of sensitive data contained within the non-voice data.

Figure 22:
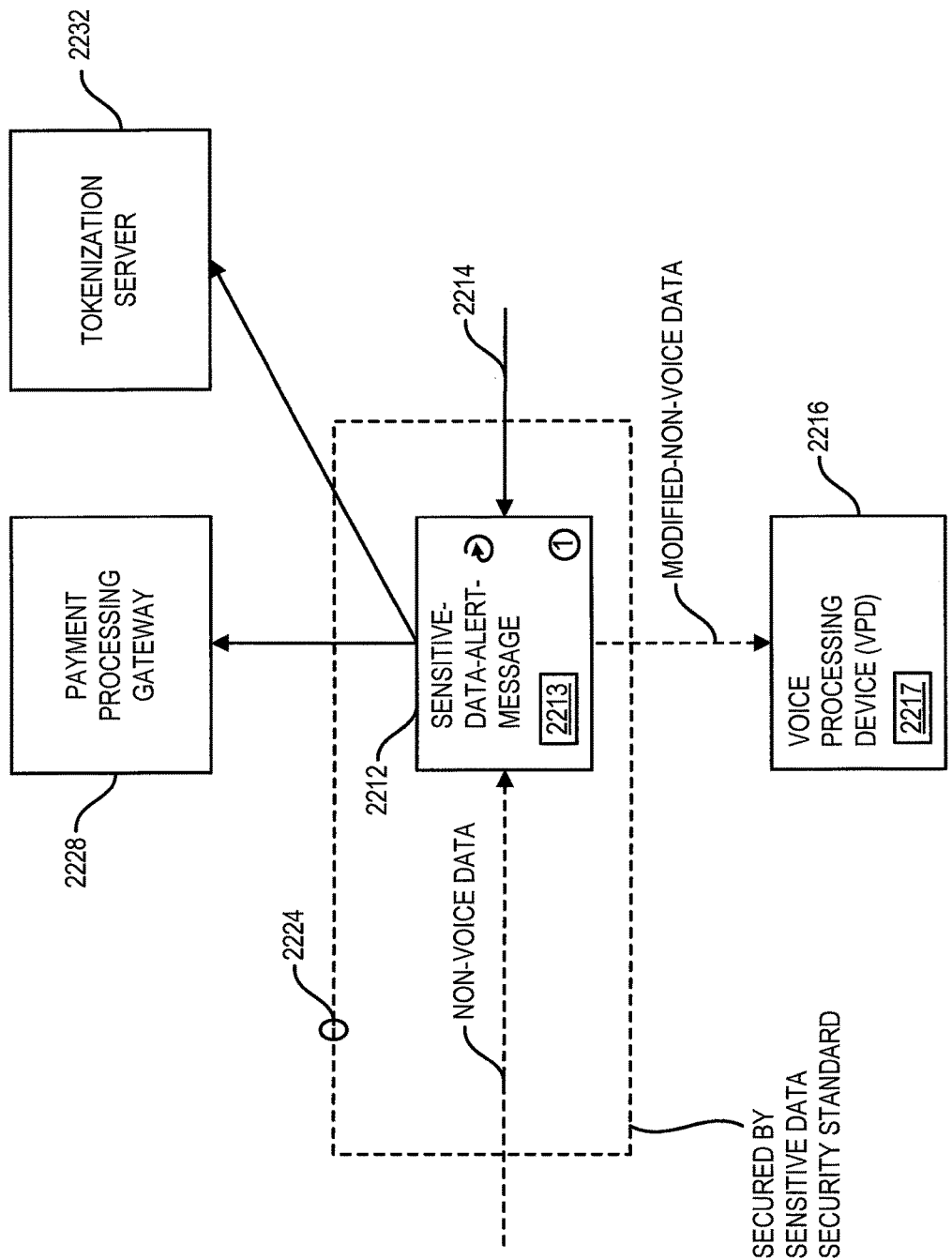
FIG. 22 illustrates an embodiment of a Data Modification Device in which a sensitive-data-alert-message is produced at the Data Modification Device.

FIG. 22 illustrates an embodiment of a Data Modification Device in which a sensitive-data-alert-message is produced at the Data Modification Device. In FIG. 22, a Data Modification Device 2212 is shown. The Data Modification Device includes a first processor 2213. The first processor receives non-voice data from a source.

In response to one or more incoming signals 2214, the first processor can determine whether conditions are appropriate for checking for sensitive data. If conditions are appropriate for checking for sensitive data, the first processor can internally generate a sensitive-data-alert-message. This could be done by setting a bit in a register of the first processor 2213, for example. The incoming signal could be, for example, a notification from a web server that a sensitive data web page, such as a credit card payment web page, is being served to the computer of a call center agent. Similarly, for example, the incoming signal could be a signal from an interactive voice response system indicating that a caller is ready to supply sensitive data, such as credit card information.

In response to the sensitive-data-alert-message, the first processor 2213 checks incoming non-voice data for sensitive data. If any sensitive data is identified, the first processor can produce a set of modified-non-voice data by removing a set of sensitive data contained within the non-voice data. The set of modified-non-voice data can then be sent from the first processor 2213 to a second processor 2217 located at a voice processing device 2216.

The first processor can send the set of sensitive data to another device, such as a Payment Processing Gateway 2228 or a Tokenization Server 2232.

The dashed line 2224 surrounding the Data Modification Device represents a sensitive data security standard. The Data Modification Device is maintained within scope of the sensitive data security standard by complying with the conditions of the standard. In contrast, the voice processing device is shown outside of the dashed line, as the voice processing device does not handle any sensitive data and thus does not need to comply with the security standard.

Figure 23:
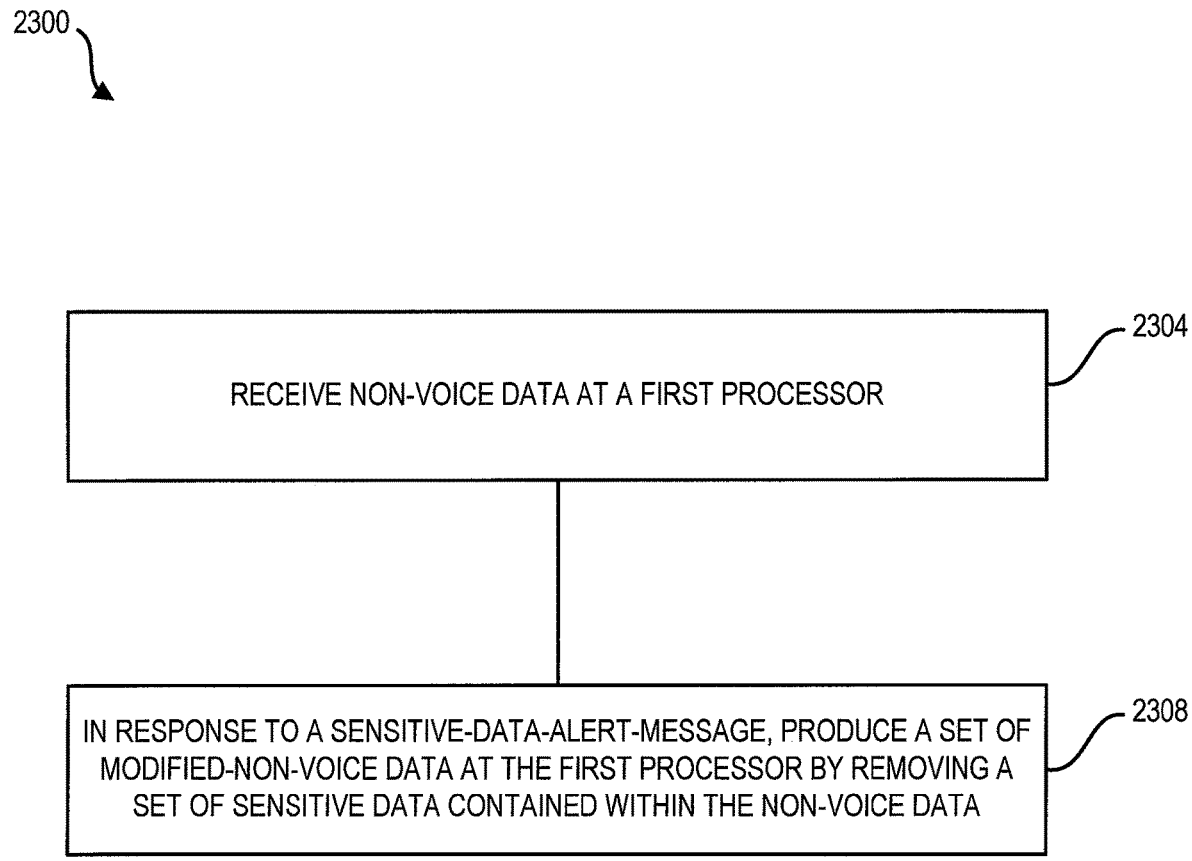
FIG. 23 illustrates a flow chart that illustrates an embodiment of a method of modifying sensitive data.

FIG. 23 is a flow chart 2300 that illustrates an embodiment of a method of modifying sensitive data. In operation block 2304, a first processor receives non-voice data. In operation block 2308, the first processor, in response to a sensitive-data-alert-message, produces a set of modified-non-voice data by removing a set of sensitive data contained within the non-voice data.

Figure 24:
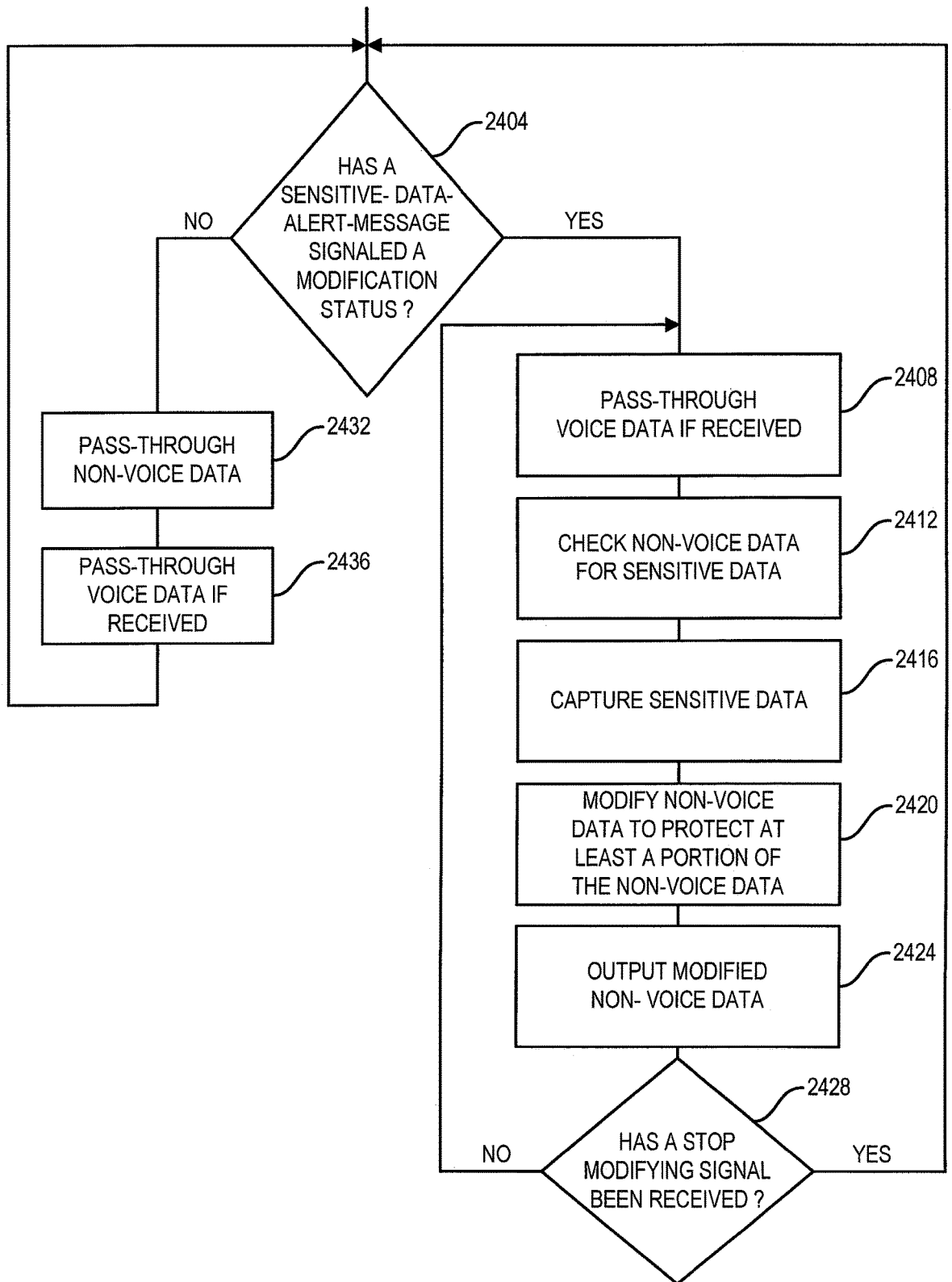
FIG. 24 illustrates a flow chart that illustrates the steps that processor of a Data Modification Device can perform, in accordance with one embodiment.

FIG. 24 illustrates a basic operation of a Data Modification Device in accordance with one embodiment. In FIG. 24, the Data Modification Device awaits a sensitive-data-alert-message. If decision block 2404 determines that non sensitive-data-alert-message has been received and therefore the Data Modification Device is not supposed to be modifying data, then in accordance with block 2432, the Data Modification Device simply passes through the received non-voice data. If the Data Modification Device is disposed to receive voice data, then the voice data is passed through as well, as shown by block 2436.

On the other hand, if a sensitive-data-alert-message has been received, then the non-voice data can be modified. However, as shown by block 2408, if the Data Modification Device is disposed to receive voice data, the voice data is simply passed through. The Data Modification Device can check the non-voice data for sensitive data, as shown by block 2412; and, capture any detected sensitive data, as shown by block 2416. At least a portion of the non-voice data can be modified to protect the sensitive data, as shown by block 2420. Block 2424 shows that the modified non-voice data can then be output.

In accordance with one embodiment, a follow-on signal can be used to signal the Data Modification Device to stop looking for sensitive data. This is shown in FIG. 24 in decision block 2428, where the Data Modification Device checks for a stop-modifying signal. If such a signal has been received, the Data Modification Device returns to block 2424. If such a signal has not been received, the Data Modification Device returns to block 2408 and continues to look for sensitive data. A stop-modifying signal is not required. The Data Modification Device could, for example, be programmed to look for a flag in the data stream that indicated that all of the sensitive data had been sent. In such an instance, the Data Modification Device could return to block 2404.

Figure 25:
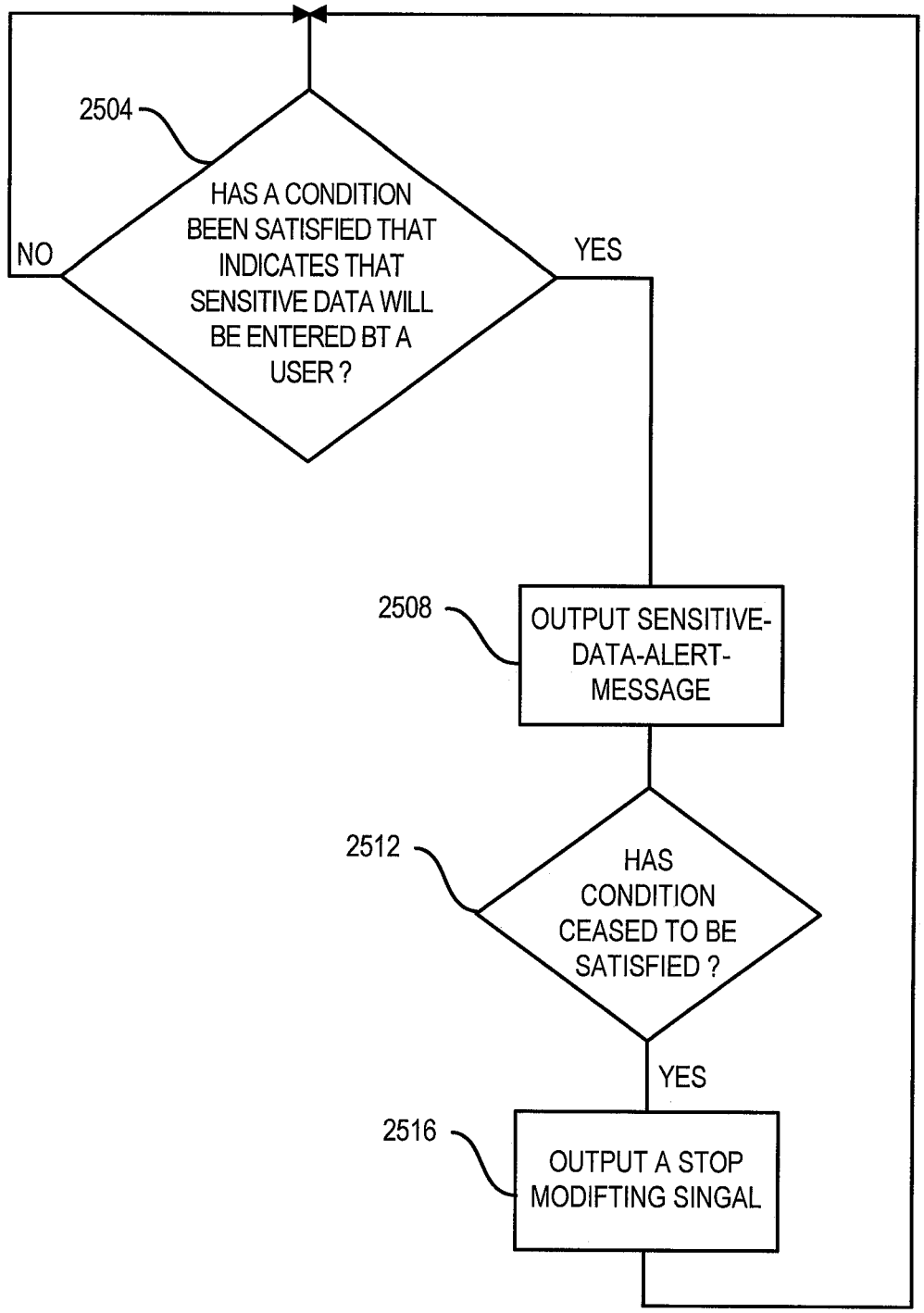
FIG. 25 illustrates a flow chart that illustrates the steps that processor of a sensitive data signaling device can perform, in accordance with one embodiment.

FIG. 25 illustrates a basic operation of a sensitive data signaling device, in accordance with one embodiment. In decision block 2504, the sensitive data signaling device determines whether a condition has been satisfied that indicates that sensitive data will be entered by a user. This could be as simple as a signal received from a web server indicating that a payment page has been served to the computer of a customer representative. If the condition is met, then the sensitive data signaling device outputs a sensitive-data-alert-message, for example to the data modification device—as shown by block 2508.

Blocks 2512 and 2516 show an optional feature for the sensitive data signaling device. These blocks provide the option for the sensitive data signaling device to generate a stop-modifying signal when a condition ceases to be met.

Figure 26:
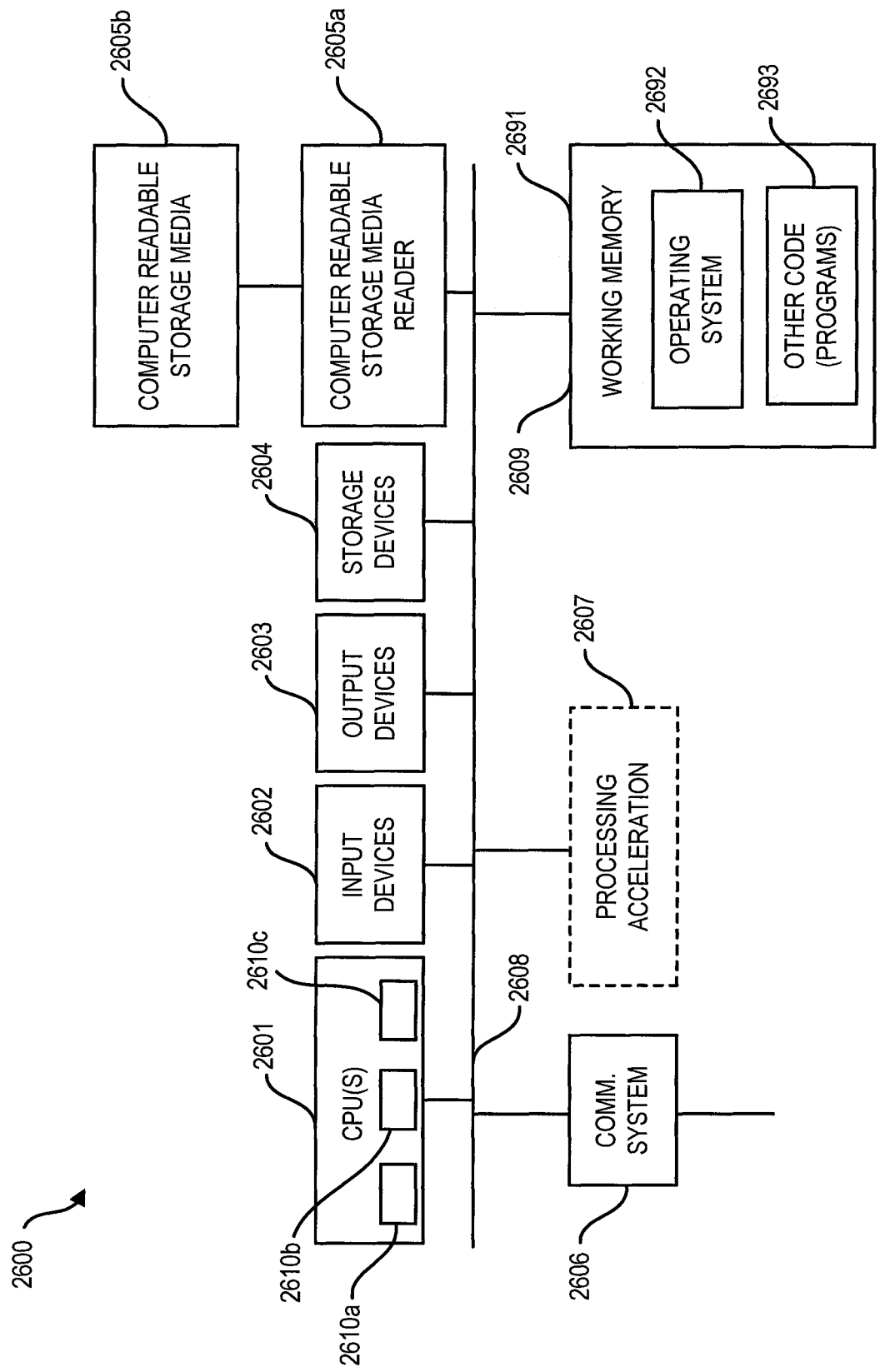
FIG. 26 illustrates a block diagram of a computer system that can be utilized to implement computer-based devices.

Each of the computers and databases described herein can be implemented by the exemplary computer system illustrated in FIG. 26. FIG. 26 broadly illustrates how individual system elements can be implemented. System 2600 is shown comprised of hardware elements that are electrically coupled via bus 2608, including a processor 2601, input device 2602, output device 2603, storage device 2604, computer-readable storage media reader 2605*a*, communications system 2606 processing acceleration (e.g., DSP or special-purpose processors) 2607 and memory 2609. Processor 2601 is shown having one or more registers such as registers 2610*a*, 2610*b*, and 2610*c*. Computer-readable storage media reader 2605*a* is further coupled to computer-readable storage media 2605*b*, the combination comprehensively representing remote, local, fixed and/or removable storage devices plus storage media, memory, etc. for temporarily and/or more permanently containing computer-readable information, which can include storage device 2604, memory 2609 and/or any other such accessible system 2600 resource. System 2600 also comprises software elements (shown as being currently located within working memory 2691) including an operating system 2692 and other code 2693, such as programs, applets, data and the like.

System 2600 has extensive flexibility and configurability. Thus, for example, a single architecture might be utilized to implement one or more servers that can be further configured in accordance with currently desirable protocols, protocol variations, extensions, etc. However, it will be apparent to those skilled in the art that embodiments may well be utilized in accordance with more specific application requirements. For example, one or more system elements might be implemented as sub-elements within a system 2600 component (e.g. within communications system 2606). Customized hardware might also be utilized and/or particular elements might be implemented in hardware, software or both. Further, while connection to other computing devices such as network input/output devices (not shown) may be employed, it is to be understood that wired, wireless, modem and/or other connection or connections to other computing devices might also be utilized. Distributed processing, multiple site viewing, information forwarding, collaboration, remote information retrieval and merging, and related capabilities are each contemplated. Operating system utilization will also vary depending on the particular host devices and/or process types (e.g. computer, appliance, portable device, etc.) Not all system 2600 components will necessarily be required in all cases.

Many other devices or subsystems (not shown) may be connected in a similar manner. Also, it is not necessary for all of the devices shown in FIG. 26 to be present to practice an embodiment. Furthermore, the devices and subsystems may be interconnected in different ways from that shown in FIG. 26. Code to implement one embodiment may be operably disposed in the internal memory or stored on storage media such as removable memory, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory). For example, in an embodiment of the computer system, code for implementing a function may be stored in the internal memory and configured to be operated by the processor or a virtual machine.

In the above description, for the purposes of explanation, numerous specific details are set forth in order to provide a thorough understanding of the embodiments described. It will be apparent, however, to one skilled in the art that these embodiments may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential, as other embodiments may omit such features.

In the interest of clarity, not necessarily all of the routine functions of the embodiments described herein are shown and described. It will, of course, be appreciated that in the development of any such actual embodiment, numerous implementation-specific decisions must be made in order to achieve the developer's specific goals, such as compliance with application—and business—related constraints, and that those specific goals will vary from one embodiment to another and from one developer to another.

According to one embodiment, the components, process steps, and/or data structures disclosed herein may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment, the components, processes and/or data structures may be implemented using machine language, assembler, C or C++, Java, PHP, Python, and/or other high level language programs running on a data processing computer such as a personal computer, workstation computer, mainframe computer, or high performance server running an OS such as Microsoft-based OS, such Windows 8, Windows 7, Windows Vista™, Windows NT®, Windows XP PRO, Windows® 2000, and Windows 10, available from Microsoft Corporation of Redmond, Washington, Apple OS X-based systems, available from Apple Inc. of Cupertino, California, BlackBerry OS, available from Blackberry Inc. of Waterloo, Ontario, Android, available from Google Inc. of Mountain View, California or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks.

Different implementations may be used and may include other types of operating systems, computing platforms, computer programs, firmware, memory, computer languages and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The above specification, examples, and data provide a complete description of the structure and use of exemplary embodiments. Furthermore, structural features of the different implementations may be combined in yet another implementation without departing from the recited claims.

What is claimed is:

1. An apparatus comprising:
a first processor configured to receive non-voice data from a session border controller;
wherein the first processor is further configured to receive a sensitive-data-alert-message from a second processor disposed at a sensitive data signaling device (SDSD);
wherein the first processor is configured to respond to the sensitive-data-alert-message from the second processor by producing a set of modified-non-voice data by removing a set of sensitive data contained within the non-voice data;
wherein the first processor is configured to send the set of modified-non-voice data to a third processor disposed at a voice processing device (VPD);
wherein the first processor and the second processor are secured in accordance with a sensitive data security standard while the VPD is not secured in accordance with the sensitive data security standard.

2. The apparatus of claim 1, wherein the non-voice data is a communication conforming to an SIP protocol.

3. The apparatus of claim 1, wherein the first processor is configured to send the set of sensitive data removed from the non-voice data to the second processor disposed at the SDSD.

4. The apparatus of claim 3, wherein the first processor is configured to encrypt the set of sensitive data before sending the encrypted set of sensitive data to the second processor disposed at the SDSD.

5. A method comprising:
receiving non-voice data at a first processor from a session border controller;
receiving a sensitive-data-alert-message at the first processor from a second processor disposed at a sensitive data signaling device (SDSD);
producing a set of modified-non-voice data at the first processor in response to the sensitive-data-alert-message from the second processor by removing a set of sensitive data contained within the non-voice data;
sending the set of modified-non-voice data from the first processor to a third processor disposed at a voice processing device (VPD);
wherein the first processor and the second processor are secured in accordance with a sensitive data security standard while the VPD is not secured in accordance with the sensitive data security standard.

6. The method of claim 5, wherein the non-voice data is a communication conforming to an SIP protocol.

7. The method of claim 5, and further comprising:
sending the set of sensitive data removed from the non-voice data to the second processor disposed at the SDSD.

8. The method of claim 7, and further comprising:
encrypting the set of sensitive data before sending the encrypted set of sensitive data to the second processor disposed at the SDSD.

9. A method comprising:
receiving a communication comprising voice data and non-voice data at a first processor;
sending the non-voice data from the first processor to a second processor;
sending the voice data from the first processor to a third processor disposed at a voice processing device (VPD);
receiving a sensitive-data-alert-message at the second processor from the third processor;
in response to the sensitive-data-alert-message from the third processor, producing a set of modified-non-voice data at the second processor by removing a set of sensitive data contained within the non-voice data;
wherein the first processor and the second processor are secured in accordance with a sensitive data security standard while the VPD is not secured in accordance with the sensitive data security standard.

10. The method of claim 9, wherein the first processor is disposed at a session border controller.

11. The method of claim 9, and further comprising:
sending the set of modified-non-voice data from the second processor to the third processor.

12. The method of claim 9, wherein the communication comprising non-voice data is a communication conforming to an SIP protocol.

13. The method of claim 9, and further comprising:
sending the set of sensitive data from second processor to a tokenization server.

14. The method of claim 9, and further comprising:
sending the set of sensitive data removed from the non-voice data to a payment processing gateway.

* * * * *